(12) United States Patent
Chen et al.

(10) Patent No.: US 7,098,978 B2
(45) Date of Patent: Aug. 29, 2006

(54) WIDE-VIEWING ANGLE LIQUID CRYSTAL DISPLAY

(75) Inventors: Chien-Hua Chen, Tao Yuan Shien (TW); Yu-Fu Lin, Tao Yuan Shien (TW); Jung-Lieh Hsu, Tao Yuan Shien (TW); Ruei-Liang Luo, Tao Yuan Shien (TW)

(73) Assignee: Quanta Display Inc., Tao Yuan Shien (TW)

( * ) Notice: Subject to any disclaimer, the term of this patent is extended or adjusted under 35 U.S.C. 154(b) by 81 days.

(21) Appl. No.: 10/914,351

(22) Filed: Aug. 9, 2004

(65) Prior Publication Data

US 2005/0219452 A1    Oct. 6, 2005

(30) Foreign Application Priority Data

Mar. 31, 2004    (TW) .................................. 93108796

(51) Int. Cl.
*G02F 1/1337*    (2006.01)
(52) U.S. Cl. ....................................................... 349/129
(58) Field of Classification Search .................. 349/129
See application file for complete search history.

(56) References Cited

U.S. PATENT DOCUMENTS

| | | | |
|---|---|---|---|
| 6,750,933 B1 * | 6/2004 | Yakovenko et al. | 349/129 |
| 6,873,386 B1 * | 3/2005 | Kim et al. | 349/129 |
| 6,879,364 B1 * | 4/2005 | Sasaki et al. | 349/129 |
| 6,894,753 B1 * | 5/2005 | Song et al. | 349/129 |
| 6,930,739 B1 * | 8/2005 | Takeda et al. | 349/129 |
| 6,930,740 B1 * | 8/2005 | Yoon et al. | 349/129 |
| 6,937,311 B1 * | 8/2005 | Song et al. | 349/129 |
| 6,940,573 B1 * | 9/2005 | Um et al. | 349/129 |

* cited by examiner

Primary Examiner—James A. Dudek
(74) Attorney, Agent, or Firm—Thomas, Kayden, Horstemeyer & Risley

(57) ABSTRACT

A wide-viewing angle LCD comprises a first substrate and a second substrate disposed opposite each other with a liquid crystal layer disposed therebetween. A first electrode is disposed on the interior of the first substrate. A first protrusion or slit structure with a first pattern is formed on the first electrode. A second electrode is disposed on the interior of the second substrate. A second protrusion or slit structure with a second pattern is formed on the second electrode. The first and second patterns constitute a third pattern with at least one intersection.

21 Claims, 23 Drawing Sheets

WIDE-VIEWING ANGLE LIQUID CRYSTAL DISPLAY

BACKGROUND

The invention relates to a wide-viewing angle liquid crystal display, and more particularly to a wide-viewing angle liquid crystal display providing omnidirectional viewing angle characteristics.

Liquid crystal displays (LCDs) have many advantages over other conventional types of displays including exceptional picture quality, small volume, light weight and lower power consumption. LCDs, for example, have been used for several years as displays in, personal digital assistants (PDAs), portable computers, mobile phones, and the like. Nevertheless, LCDs suffer from poor viewing angle characteristics.

In order to improve the viewing angle characteristics, various proposals have been made. Recently, an MVA (Multi-domain Vertical Alignment) type LCD was proposed by Fujitsu Co. Ltd. of Japan. FIGS. 1A and 1B are cross-section views showing the operation of a conventional MVA-LCD. FIG. 1A shows the state of liquid crystal molecules inside the LCD when no external electric field is present or the electric field presence is lower than a threshold value. The color filter (CF) glass substrate 100 and the thin film transistor (TFT) glass substrate 102 are parallel to each other. Protrusions 104 and 106 are formed on the inner surface of both the CF glass substrate 100 and the TFT glass substrate 102. Liquid crystal molecules 108 having negative dielectric anisotropy (referred to in the following as negative type liquid crystal molecules 108) are vertically aligned between the CF glass substrate 100 and the TFT glass substrate 102, constituting a liquid crystal layer 110. Liquid crystal molecules 108 close to the protrusions 104 and 106 tilt in specific direction due to local elects and resulting in pre-tilts.

FIG. 1B shows the state of liquid crystal molecules inside the LCD when an electric field above a threshold value is present. Due to the strong electric field, orientation of the negative type liquid crystal molecules 108 is changed such that directors of the liquid crystal molecules 108 are aligned in a direction vertical to the electric field. Hence, within the same pixel, liquid crystal molecules 108 on each side of the protrusion will tilt oppositely and have different molecular alignment. The protrusions 104 and 106 within a pixel divide the pixel into two or more domains. In other words, a multi-domain pixel is formed improving the viewing angle of LCD.

FIG. 2 is a schematic top view showing a conventional MVA-LCD with a W-shaped protrusion structure. The conventional MVA-LCD comprises a plurality of pixel units 210 defined by crossing bus lines. The protrusions 104 with a first W-shaped pattern are formed on the CF substrate 100. The protrusions 106 with a second W-shaped pattern are formed on the TFT substrate 102. The first and second W-shaped patterns are alternately positioned. A common line 220, serving as an electrode for the storage capacitor Cs, passes through the middle portion of each pixel unit 210. Through the alternately positioned protrusions 104 and 106 on the inner surfaces of different glass substrates of a pixel unit 210, each pixel unit 210 is divided into four different domains. The liquid crystal molecules 108 inside the conventional MVA-LCD tilt in four specific directions, providing viewing angle characteristics that are not omnidirectional and are thus inferior, particularly in the direction which is about ±45° and ±135° to the bus lines.

U.S. Pat. No. 6,532,054 to Ohmuro et al., the entirety of which is hereby incorporated by reference, describes a liquid crystal display having excellent display characteristics. FIGS. 16 and 17 of the reference show protrusion patterns are not extended in one direction, whereby alignment directions of the liquid crystal molecules are approximately omnidirectional.

SUMMARY

Embodiments of the invention provide a wide-viewing liquid crystal display, providing omnidirectional viewing angle characteristics.

An embodiment of the wide-viewing angle LCD of the invention comprises a plurality of pixel units, each comprising: a first substrate and a second substrate disposed opposite each other with a liquid crystal layer interposed therebetween; a first electrode formed on the interior of the first substrate; a first protrusion structure with a first pattern formed on the first electrode; a second electrode formed on the interior of the second substrate; and a second protrusion structure with a second pattern formed on the second electrode, wherein the first and second patterns constitute a third pattern with at least one intersection.

Another embodiment of the wide-viewing angle LCD of the invention comprises a plurality of pixel units, each comprising: a first substrate and a second substrate disposed opposite each other with a liquid crystal layer interposed therebetween; a first electrode formed on the interior of the first substrate; a protrusion structure with a first pattern formed on the first electrode; a second electrode formed on the interior of the second substrate; and a slit structure with a second pattern formed on the second electrode, wherein the first and second patterns constitute a third pattern with at least one intersection.

Another embodiment of the wide-viewing angle LCD of the invention comprises a plurality of pixel units, each comprising: a first substrate and a second substrate disposed opposite each other with a liquid crystal layer interposed therebetween; a first electrode formed on the interior of the first substrate; a first slit structure with a first pattern formed on the first electrode; a second electrode formed on the interior of the second substrate; and a second slit structure with a second pattern formed on the second electrode, wherein the first and second patterns constitute a third pattern with at least one intersection.

Embodiments of the invention improve on the conventional technology in that the first protrusion or slit pattern on the first electrode and the second protrusion or slit pattern on the second electrode constitute a third pattern with at least one intersection. A liquid crystal molecule orientation area has a whirlwind arrangement surrounding the intersection, thereby improving display characteristics.

Further scope of applicability of embodiments of the invention will become apparent from the detailed description given hereinafter. It should be understood that the detailed description and specific examples are given by way of illustration only, since various changes and modifications within the spirit and scope of the invention will become apparent to those skilled in the art from this detailed description.

DESCRIPTION OF THE DRAWINGS

Embodiments of the invention will become more fully understood from the detailed description given in the following and the accompanying drawings, given by way of illustration only and thus not intended to be limitative of the invention, and wherein.

DETAILED DESCRIPTION

Reference will now be made in detail to embodiments of the invention, examples of which are illustrated in the accompanying drawings.

First Embodiment

Figure 1A:
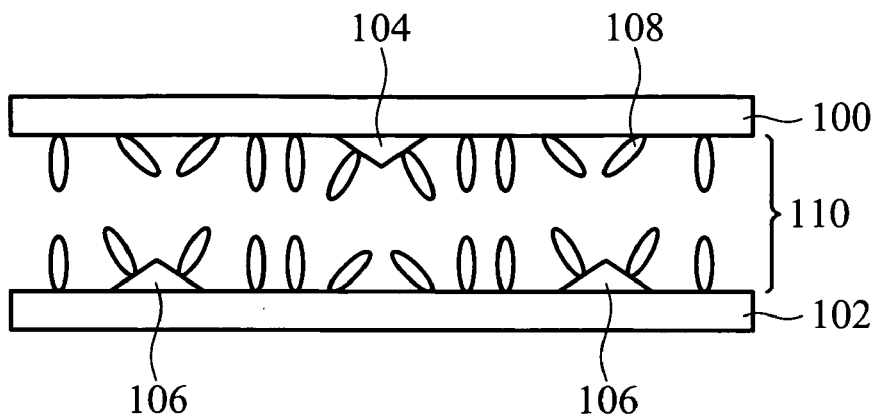
FIGS. 1A and 1B are cross-section views showing the operation of a conventional MVA-LCD.
Figure 1B:
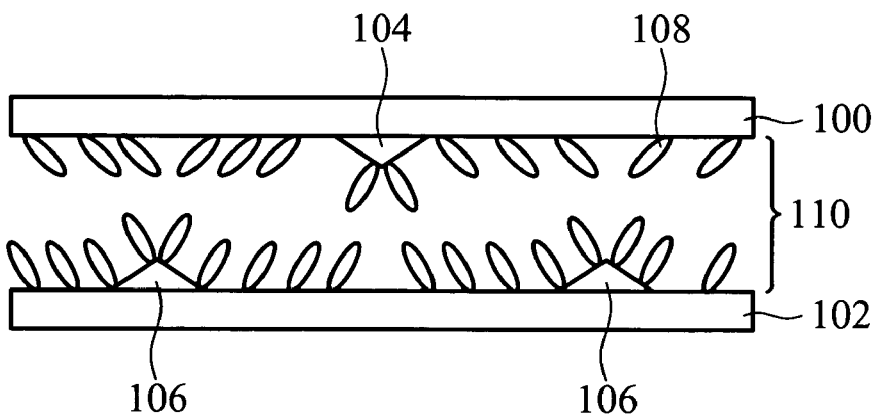
Figure 2:
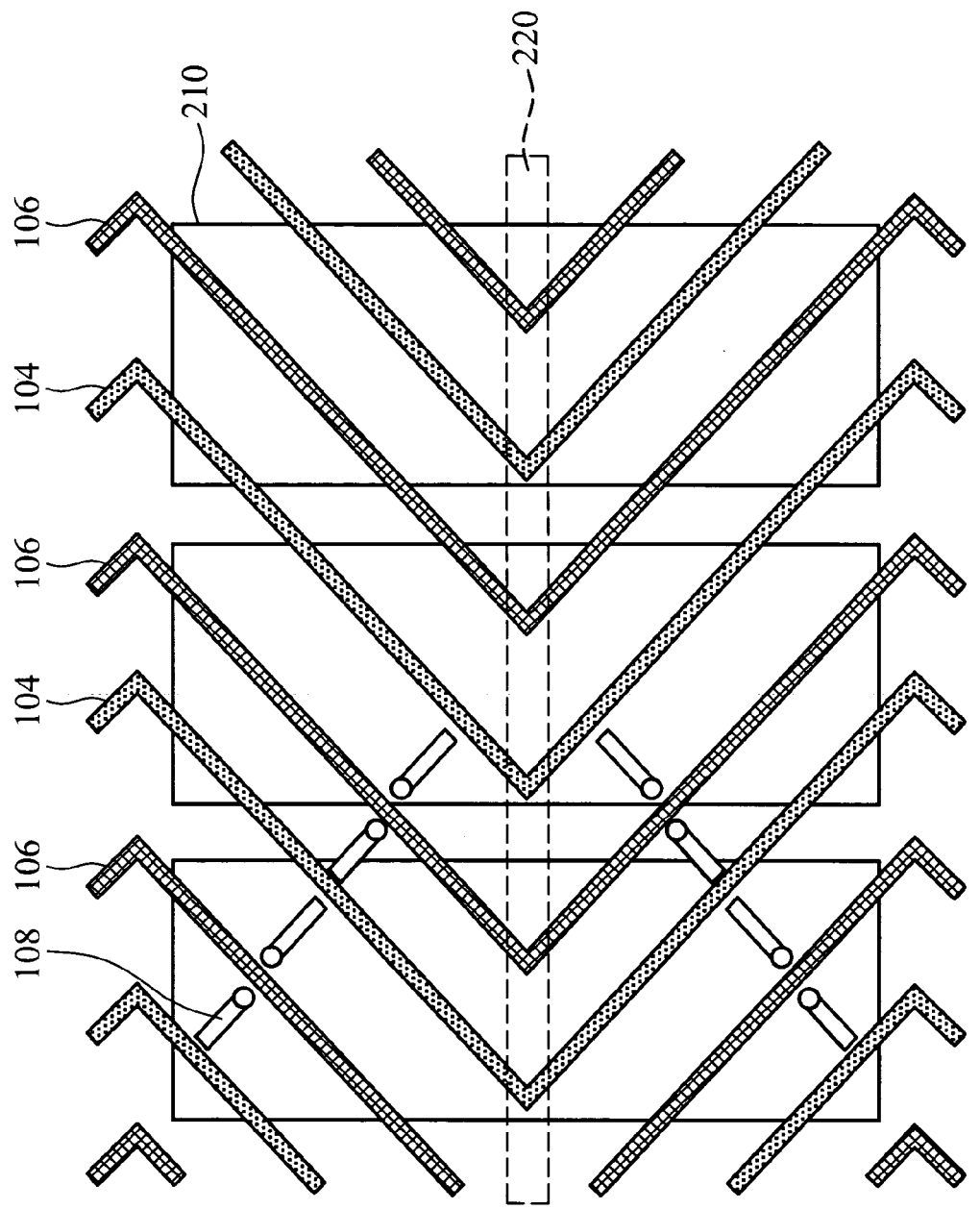
FIG. 2 is a schematic top view showing a conventional MVA-LCD with a W-shaped protrusion structure.
Figure 3A:
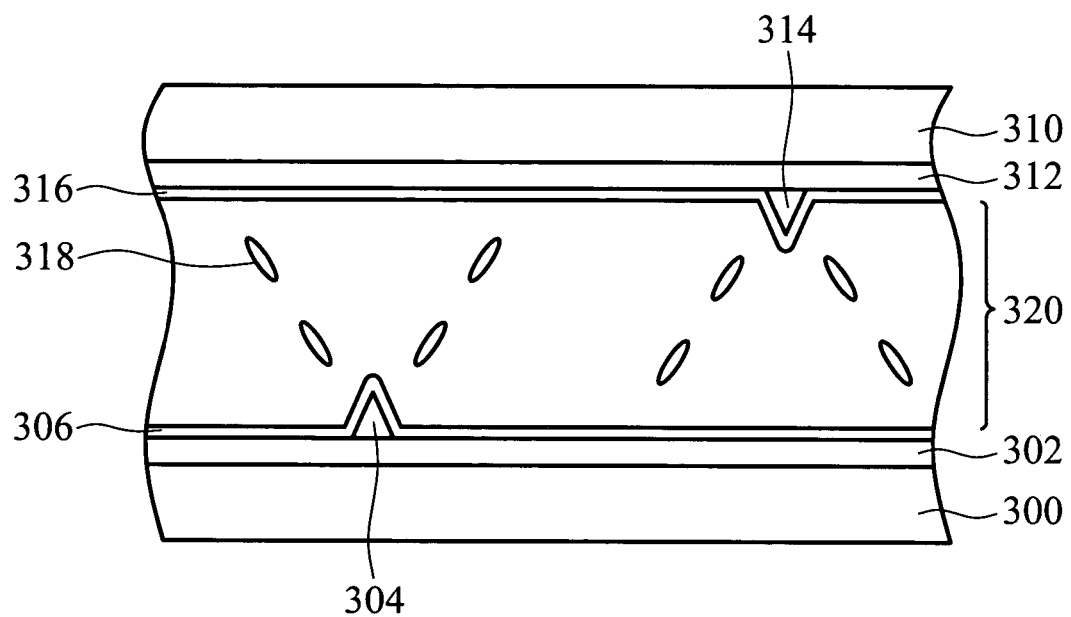
FIG. 3A is a partial cross-section view of a wide-viewing angle LCD according to a first embodiment of the invention, taken along line 3A—3A of FIG. 3B.
Figure 3B:
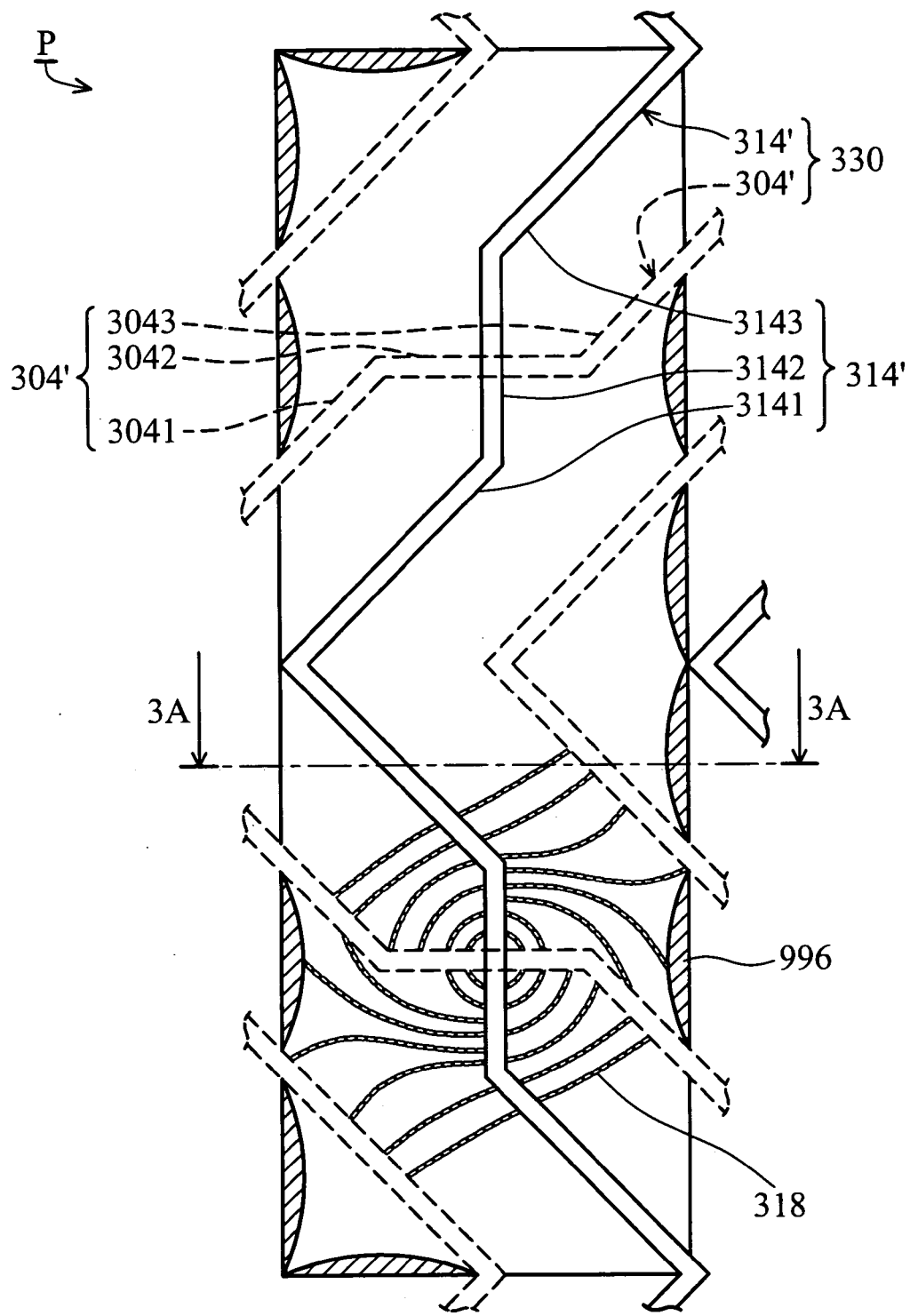
FIG. 3B is a schematic top view showing one of the pixels of a wide-viewing angle LCD according to the first embodiment of the invention.
Figure 3C:
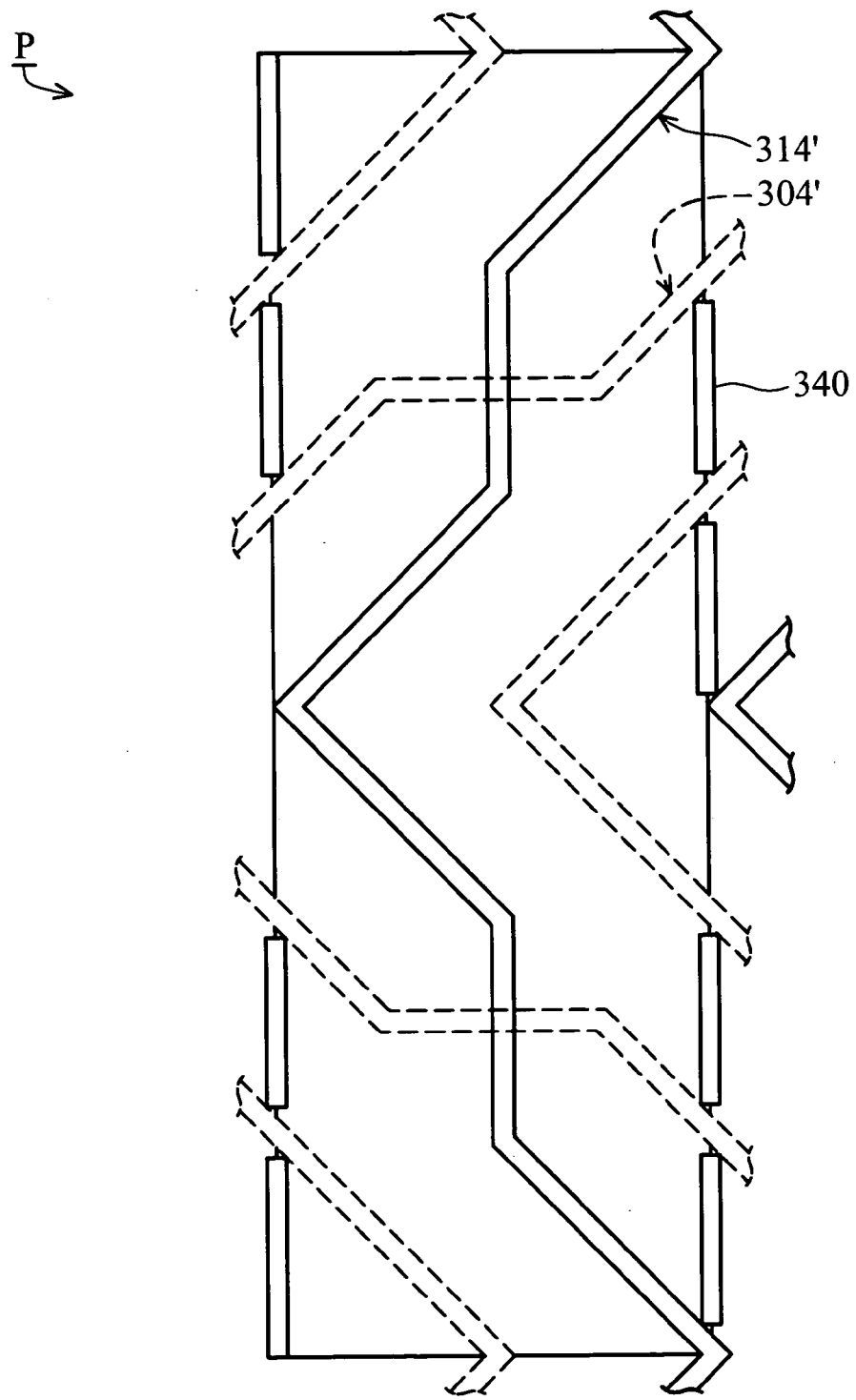
FIGS. 3C, 3D and 3E are schematic top views showing one of the pixels of a wide-viewing angle LCD according to variations of the first embodiment.
Figure 3D:
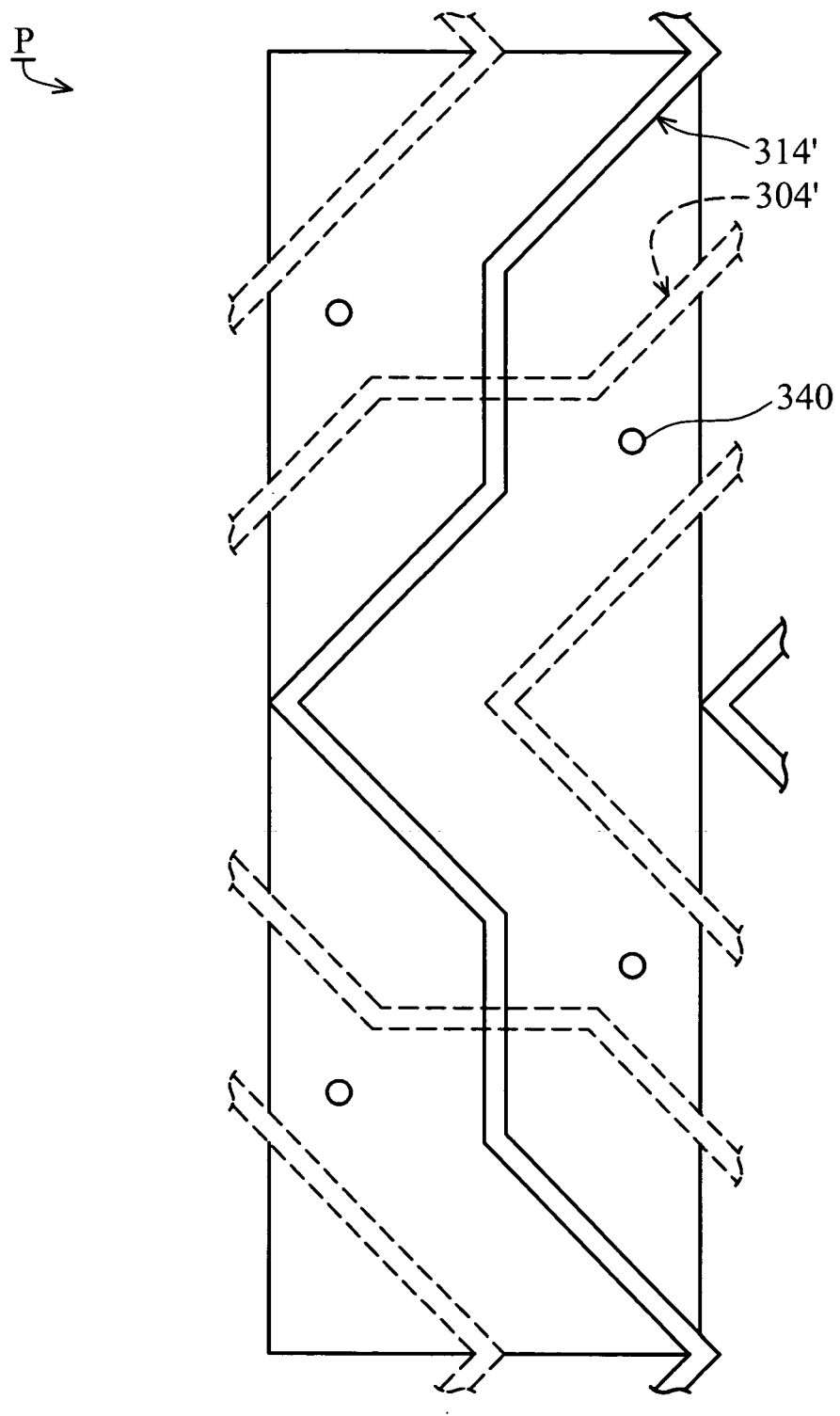
Figure 3E:
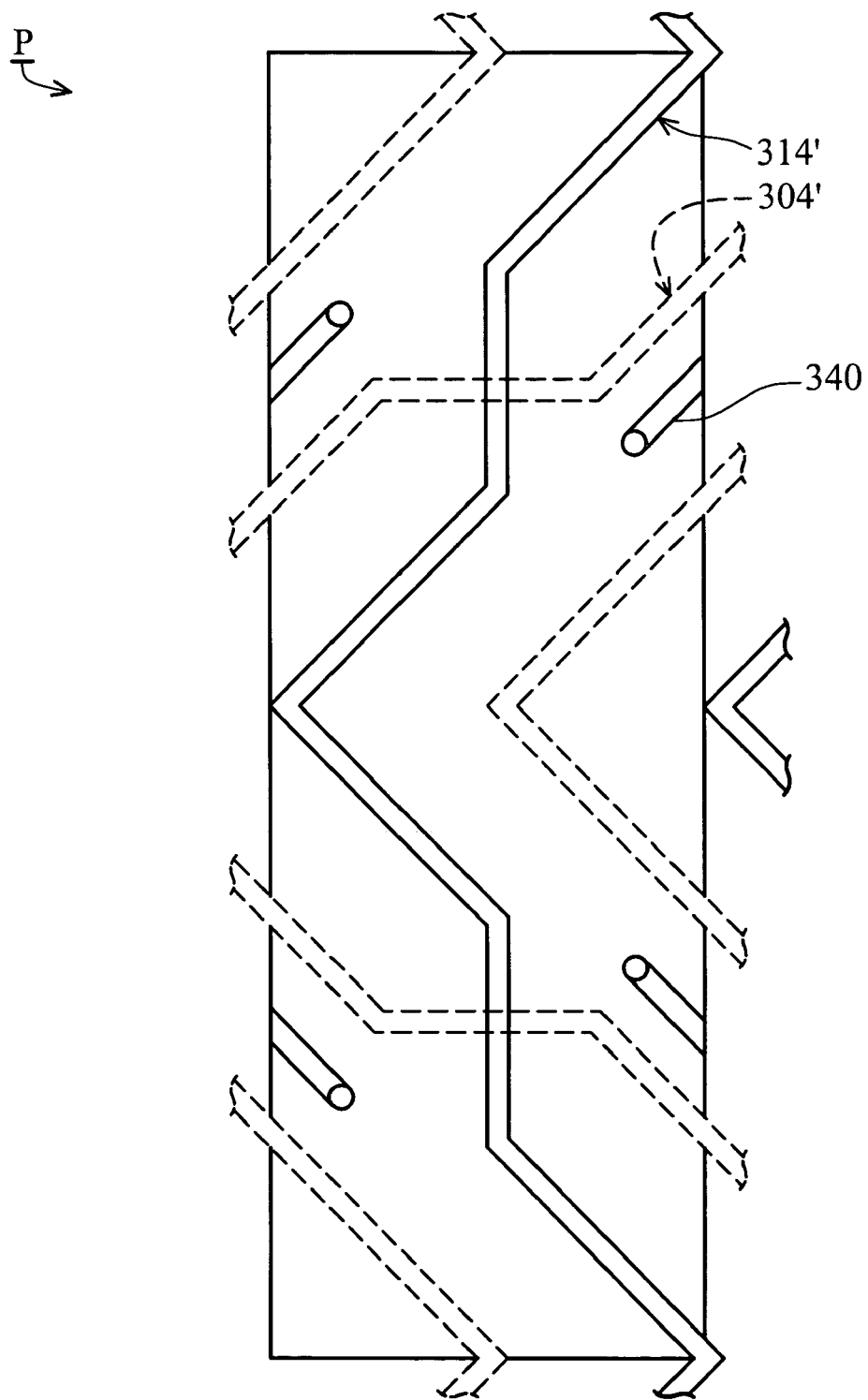

FIG. 3A is a partial cross-section view of a wide-viewing angle LCD according to a first embodiment of the invention, taken along line 3A—3A of FIG. 3B. FIG. 3B is a schematic top view showing one of the pixels of a wide-viewing angle LCD according to the first embodiment of the invention. FIGS. 3C, 3D and 3E are schematic top views showing one of the pixels of a wide-viewing angle LCD according to variations of the first embodiment. As shown in FIGS. 3B~3E, crossing bus lines (i.e. gate and data lines) define a pixel unit P. Although a single pixel unit P is illustrated in FIGS. 3A~3E, a liquid crystal display typically has a plurality of pixel units P arranged in an array.

In FIGS. 3A and 3B, a first substrate 300 and a second substrate 310 are parallel to each other. The first substrate 300 can be a glass substrate comprising a thin film transistor (TFT, not shown). The second substrate 310 can be a glass substrate comprising a color filter (CF, not shown). A pixel electrode 302 is disposed on the interior of the first substrate 100. The pixel electrode 302 can be a transparent conductive layer, such as indium-tin-oxide (ITO) or indium-zinc-oxide (IZO), formed by deposition and patterning. The pixel electrode 302 is electrically connected to the TFT (not shown). A first protrusion structure 304 with a first pattern 304' is then disposed on the pixel electrode 302. The first protrusion structure 304 can be an insulating layer of photoresist formed by deposition and patterning. A first alignment film 306 is next formed on the pixel electrode 302 to cover the first protrusion structure 304. Referring to FIG. 3B, the first pattern 304' comprises sequential combinations of a first line segment 3041, a second line segment 3042 and a third line segment 3043. The first and third line segments 3041 and 3043 are parallel but not opposite to each other. The second line segment 3042 is not parallel and not perpendicular to the first and third line segments 3041 and 3043.

A common electrode 312 is disposed on the interior of the second substrate 310. The common electrode 312 can be a transparent conductive layer, such as ITO or IZO, formed by deposition. A second protrusion structure 314 with a second pattern 314' is then disposed on the common electrode 312. The second protrusion structure 314 can be an insulating layer of photoresist formed by deposition and patterning. A second alignment film 316 is next formed on the common electrode 312 to cover the second protrusion structure 314. Referring to FIG. 3B, the second pattern 314' comprises sequential combinations of a fourth line segment 3141, a fifth line segment 3142 and a sixth line segment 3143. The fourth and sixth line segments 3141 and 3143 are parallel but not opposite to each other. The fifth line segment 3142 is not parallel and not perpendicular to the fourth and sixth line segments 3141 and 3143.

Negative type liquid crystal molecules 318 ($\Delta\epsilon<0$) are then filled in a space between the first substrate 300 and the second substrate 310, constituting a liquid crystal layer 320.

Note that the first pattern 304' and the second pattern 314' constitute a third pattern 330 with at least one intersection. That is, the second line segment 3042 and the fifth line segment 3142 cross. According to the first embodiment, a liquid crystal molecule orientation area has a whirlwind arrangement surrounding the intersection (i.e. the cross). A liquid crystal display with omnidirectional viewing angle characteristics is thus obtained.

Although the cross-section views of the protrusion structures 304 and 314 shown in FIG. 3A are triangular, the protrusion structures 304 and 314 can be rectangular, oval, circular or similar.

Due to the transverse electric fields between bus lines (i.e. gate and data lines), disclination areas 996 occur in the regions as shaded in FIG. 3B. In order to prevent the occurrence of the disclination areas 996, variations of the first embodiment are provided. The occurrence of the disclination areas 996 is described in, for example, U.S. Pat. Nos. 6,532,054, 6,661,488 and other references, hence discussion thereof is omitted herein. In FIGS. 3C, 3D and 3E, a third protrusion structure 340 is formed on part of the common electrode 312. The location of the third protrusion structure 340 corresponds to a region near an interior side of the pixel electrode 302 (or the pixel unit P). The third protrusion structure 340 results in orderly alignment of liquid crystal molecules to prevent occurrence of disclination areas 996. The protrusion structure 340 can be a linear protrusion structure shown in FIG. 3C, a circular protrusion structure shown in FIG. 3D or combinations of linear and circular protrusion structures shown in FIG. 3E. Note that a slit structure can replace the third protrusion structure 340, and achieves the same effect of preventing occurrence of disclination areas 996.

Second Embodiment

Figure 4A:
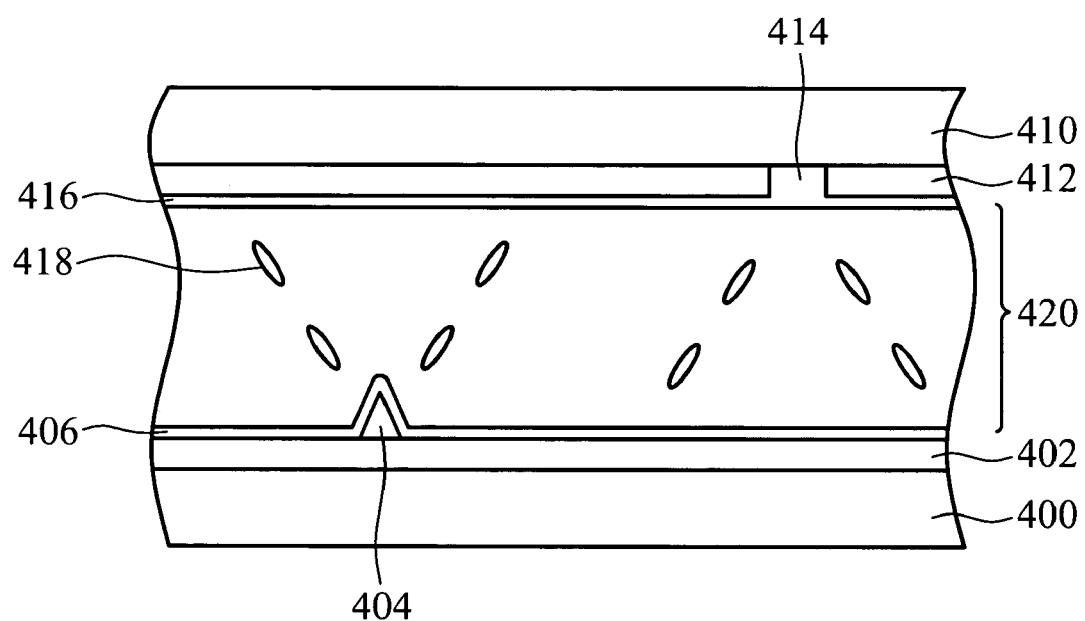
FIG. 4A is a partial cross-section view of a wide-viewing angle LCD according to a second embodiment of the invention, taken along line 4A—4A of FIG. 4B.
Figure 4B:
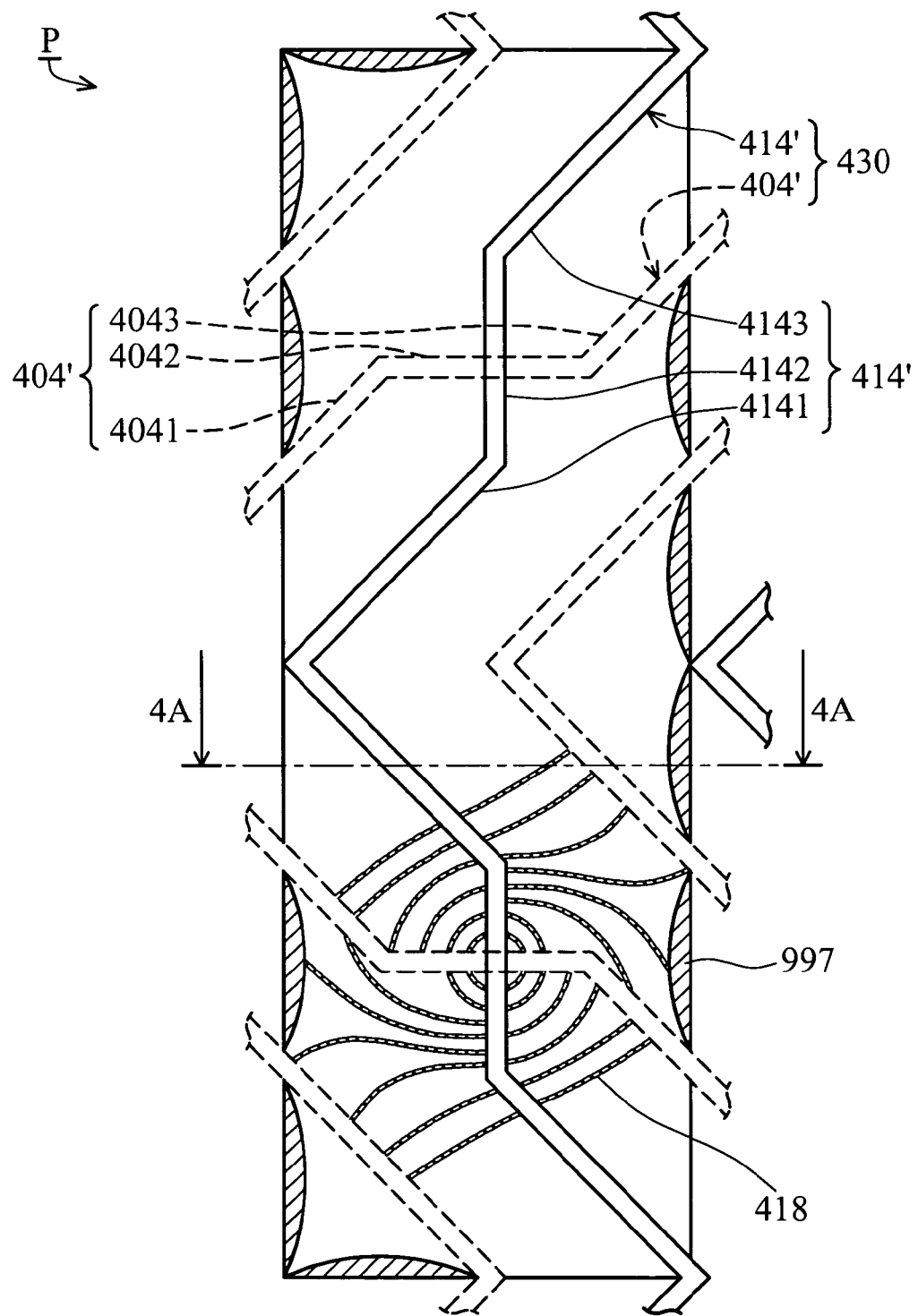
FIG. 4B is a schematic top view showing one of the pixels of a wide-viewing angle LCD according to the second embodiment of the invention.
Figure 4C:
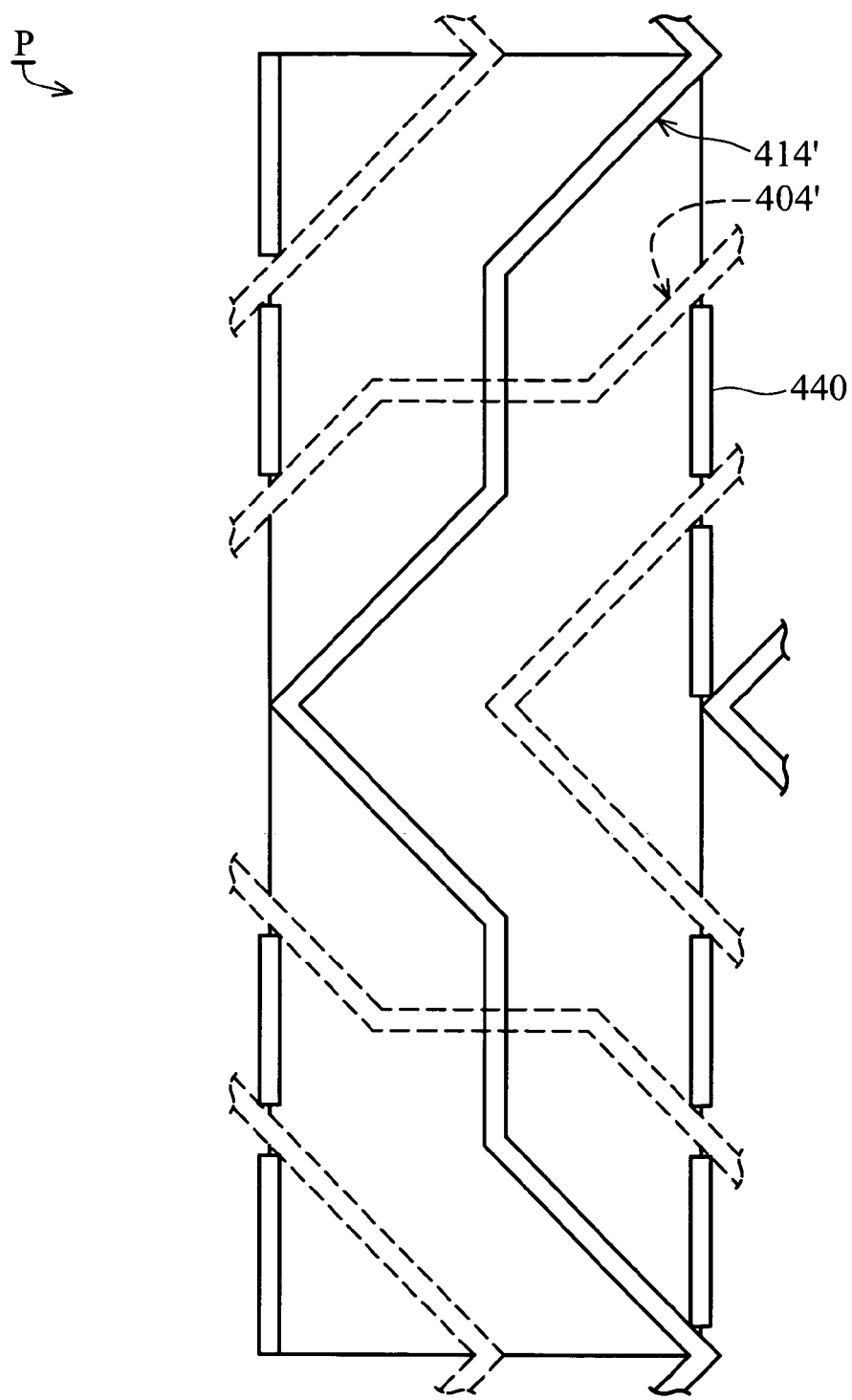
FIGS. 4C, 4D and 4E are schematic top views showing one of the pixels of a wide-viewing angle LCD according to variations of the second embodiment.
Figure 4D:
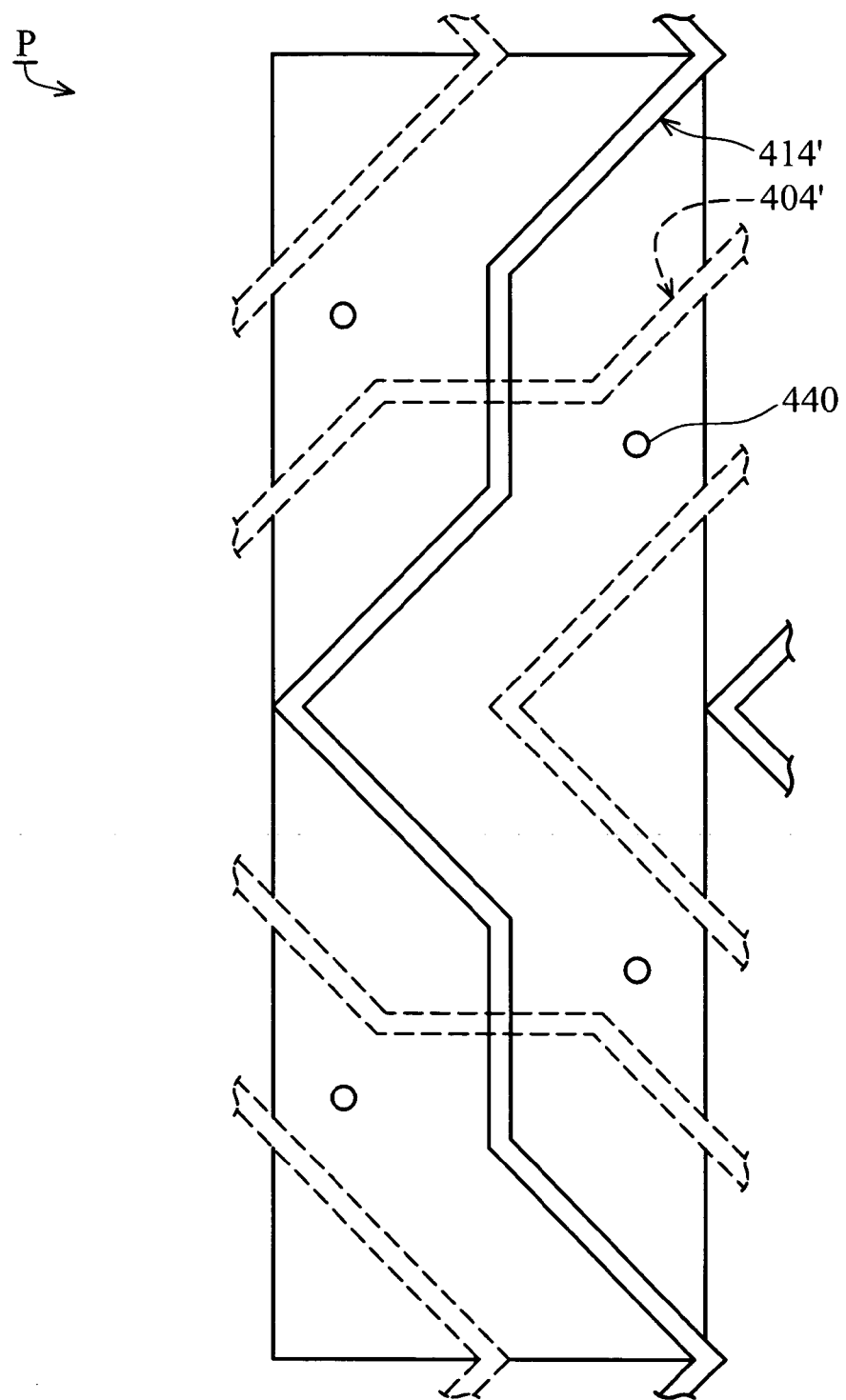
Figure 4E:
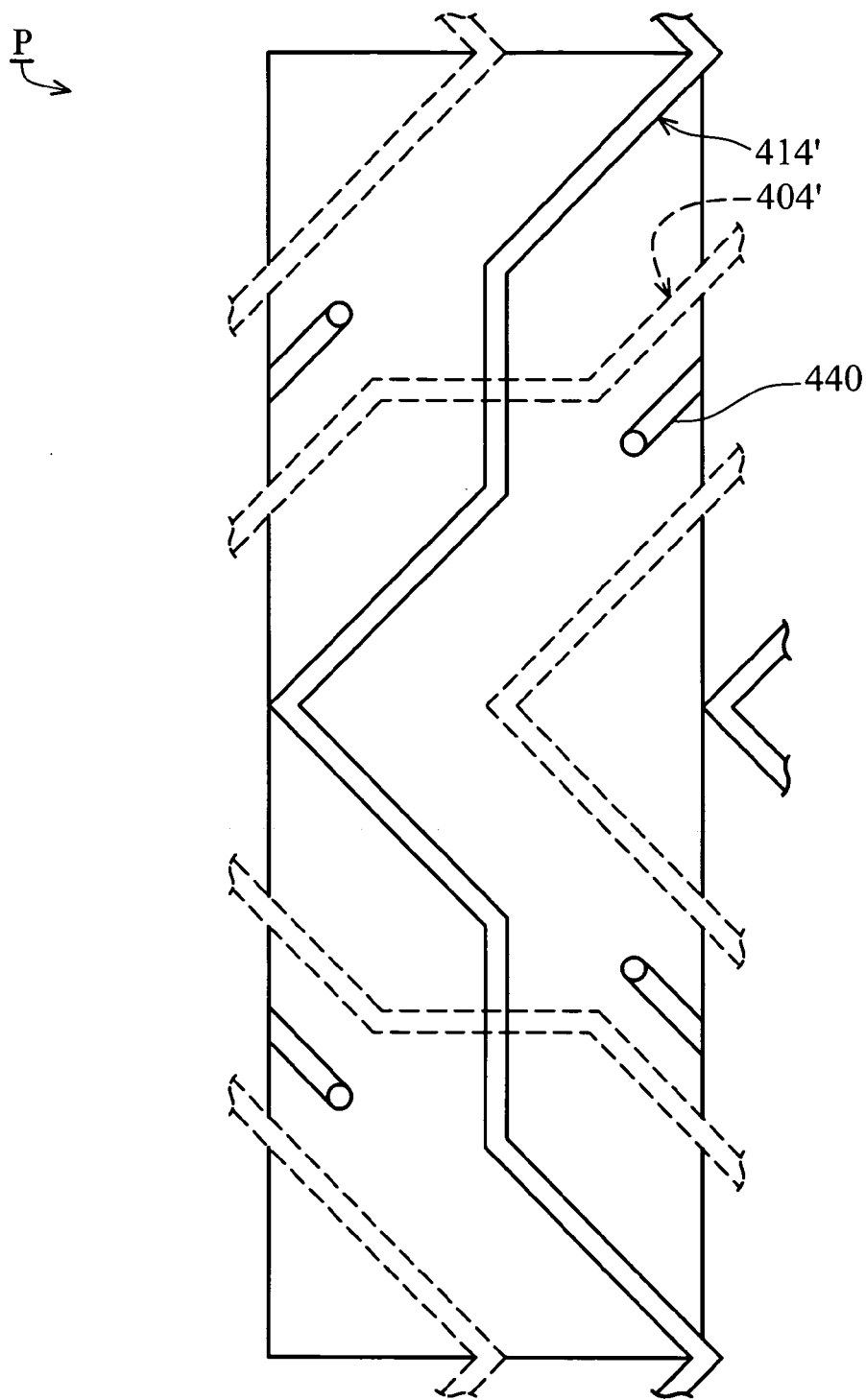

FIG. 4A is a partial cross-section view of a wide-viewing angle LCD according to a second embodiment of the invention, taken along line 4A—4A of FIG. 4B. FIG. 4B is a schema-tic top view showing one of the pixels of a wide-viewing angle LCD according to the second embodiment of the invention. FIGS. 4C, 4D and 4E are schematic top views showing one of the pixels of a wide-viewing angle LCD according to variations of the second embodiment. As shown in FIGS. 4B~4E, crossing bus lines (i.e. gate and data lines) define a pixel unit P. Although a single pixel unit P is illustrated in FIGS. 4A~4E, a liquid crystal display typically has a plurality of pixel units P arranged in an array.

In FIGS. 4A and 4B, a first substrate 400 and a second substrate 410 are parallel to each other. The first substrate 400 can be a glass substrate comprising a thin film transistor (TFT, not shown). The second substrate 410 can be a glass substrate comprising a color filter (CF, not shown). A pixel electrode 402 is disposed on the interior of the first substrate 400. The pixel electrode 402 can be a transparent conductive layer, such as indium-tin-oxide (ITO) or indium-zinc-oxide (IZO), formed by deposition and patterning. The pixel electrode 402 is electrically connected to the TFT (not shown). A protrusion structure 404 with a first pattern 404' is then disposed on the pixel electrode 402. The protrusion structure 404 can be an insulating layer of photoresist formed by deposition and patterning. A first alignment film 406 is next formed on the pixel electrode 402 to cover the protrusion structure 404. Referring to FIG. 4B, the first pattern 404' comprises sequential combinations of a first line segment 4041, a second line segment 4042 and a third line segment 4043. The first and third line segments 4041 and 4043 are parallel but not opposite to each other. The second line segment 4042 is not parallel and not perpendicular to the first and third line segments 4041 and 4043.

A common electrode 412 is disposed on the interior of the second substrate 410. The common electrode 412 can be a transparent conductive layer, such as ITO or IZO, formed by deposition. A first slit structure 414 with a second pattern 414' is then formed in the common electrode 412. A second alignment film 416 is next formed on the common electrode 412 to cover the first slit structure 414. Referring to FIG. 4B, the second pattern 414' comprises sequential combinations of a fourth line segment 4141, a fifth line segment 4142 and a sixth line segment 4143. The fourth and sixth line segments 4141 and 4143 are parallel but not opposite to each other. The fifth line segment 4142 is not parallel and not perpendicular to the fourth and sixth line segments 4141 and 4143.

Negative type liquid crystal molecules 418 ($\Delta\epsilon<0$) are then filled in a space between the first substrate 400 and the second substrate 410, constituting a liquid crystal layer 420.

Note that the first pattern 404' and the second pattern 414' constitute a third pattern 430 with at least one intersection. That is, the second line segment 4042 and the fifth line segment 4142 constitute a cross. According to the second embodiment, a liquid crystal molecule orientation area has a whirlwind arrangement surrounding the intersection (i.e. the cross). A liquid crystal display with omnidirectional viewing angle characteristics is thus obtained.

Due to the transverse electric fields between bus lines (i.e. gate and data lines), disclination areas 997 occur in the regions as shaded in FIG. 4B. In order to prevent occurrence of the disclination areas 997, variations of the second embodiment are provided. In FIGS. 4C, 4D and 4E, a second slit structure 440 is formed on part of the common electrode 412. The location of the second slit structure 440 corresponds to a region near an interior side of the pixel electrode 402 (or the pixel unit P). The second slit structure 440 results in orderly alignment of liquid crystal molecules, preventing the occurrence of disclination areas 997. The second slit structure 440 can be a linear slit structure shown in FIG. 4C, a circular slit structure shown in FIG. 4D or combinations of linear and circular slit structures shown in FIG. 4E. Note that a protrusion structure can replace the second slit structure 440, and achieves the same effect of preventing occurrence of disclination areas 997.

Third Embodiment

Figure 5A:
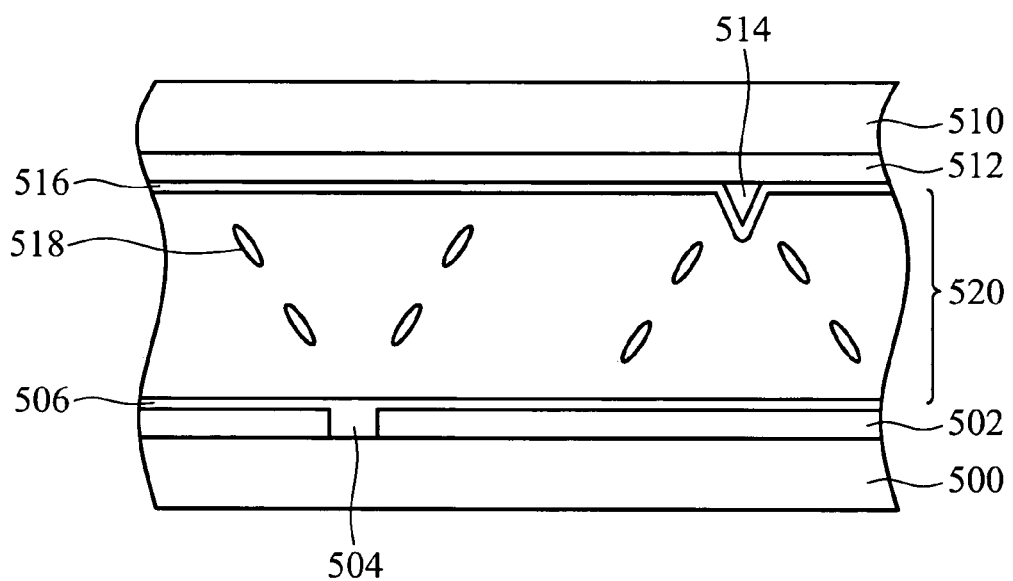
FIG. 5A is a partial cross-section view of a wide-viewing angle LCD according to a third embodiment of the invention, taken along line 5A—5A of FIG. 5B.
Figure 5B:
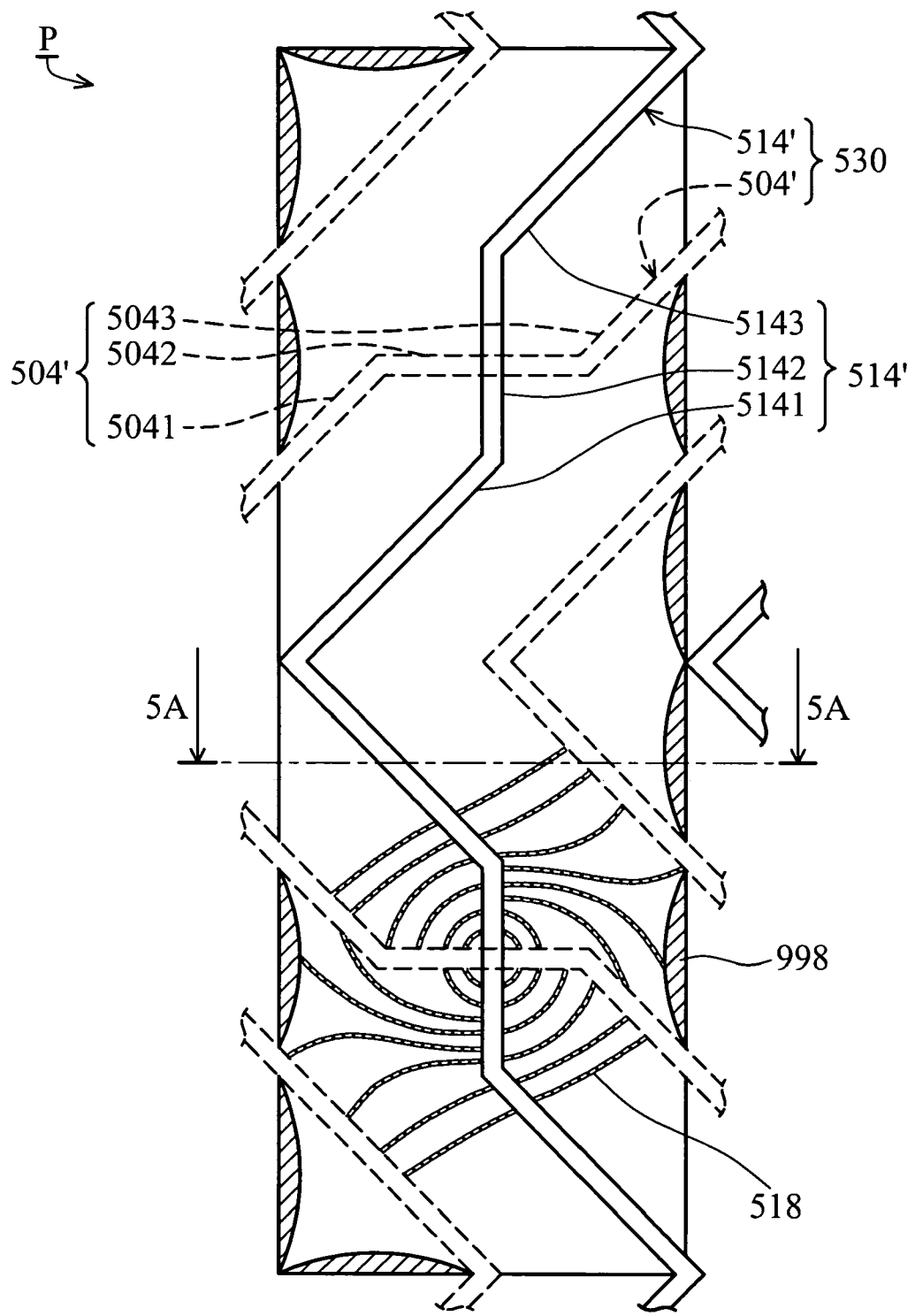
FIG. 5B is a schematic top view showing one of the pixels of a wide-viewing angle LCD according to the third embodiment of the invention.
Figure 5C:
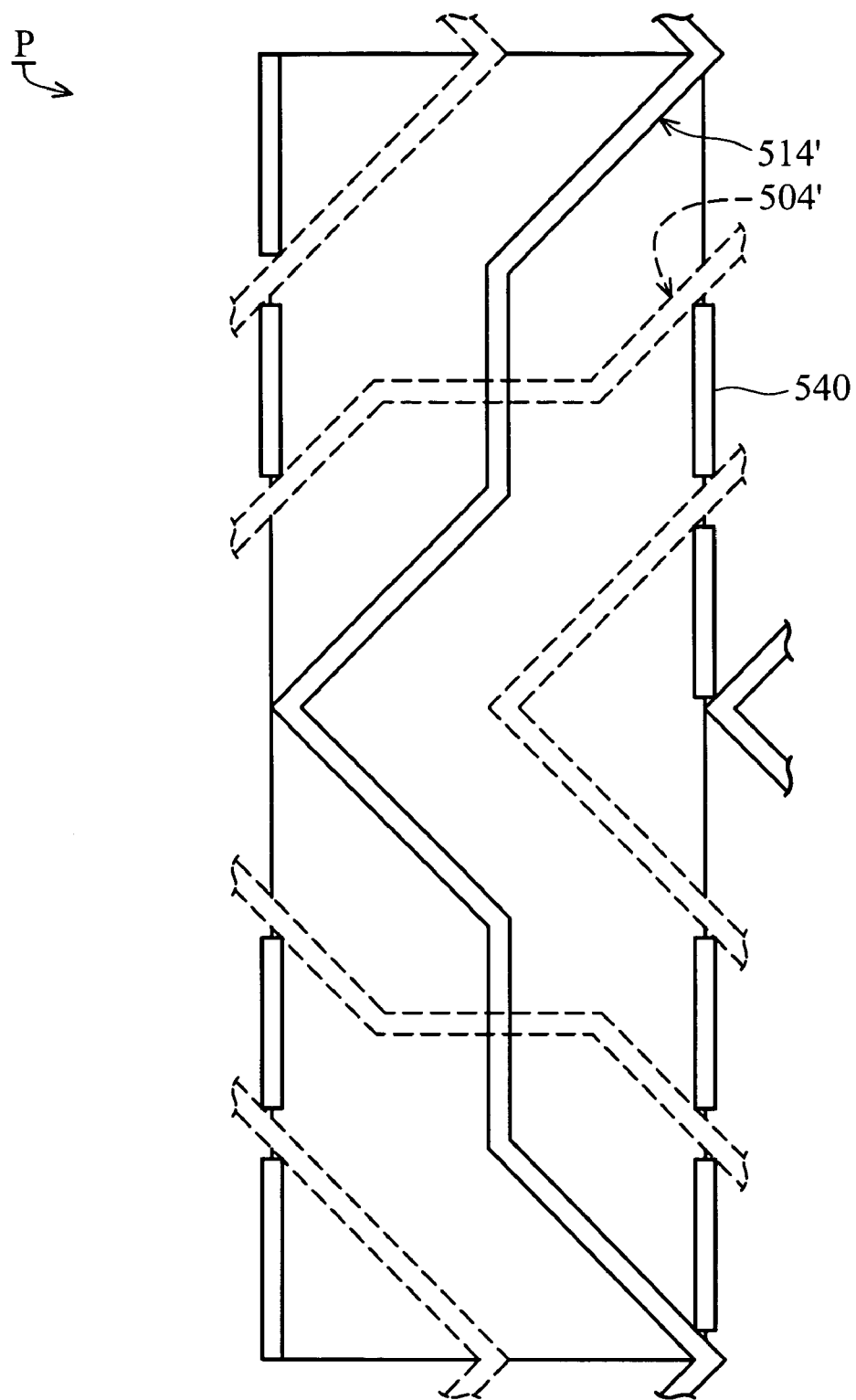
FIGS. 5C, 5D and 5E are schematic top views showing one of the pixels of a wide-viewing angle LCD according to variations of the third embodiment.
Figure 5D:
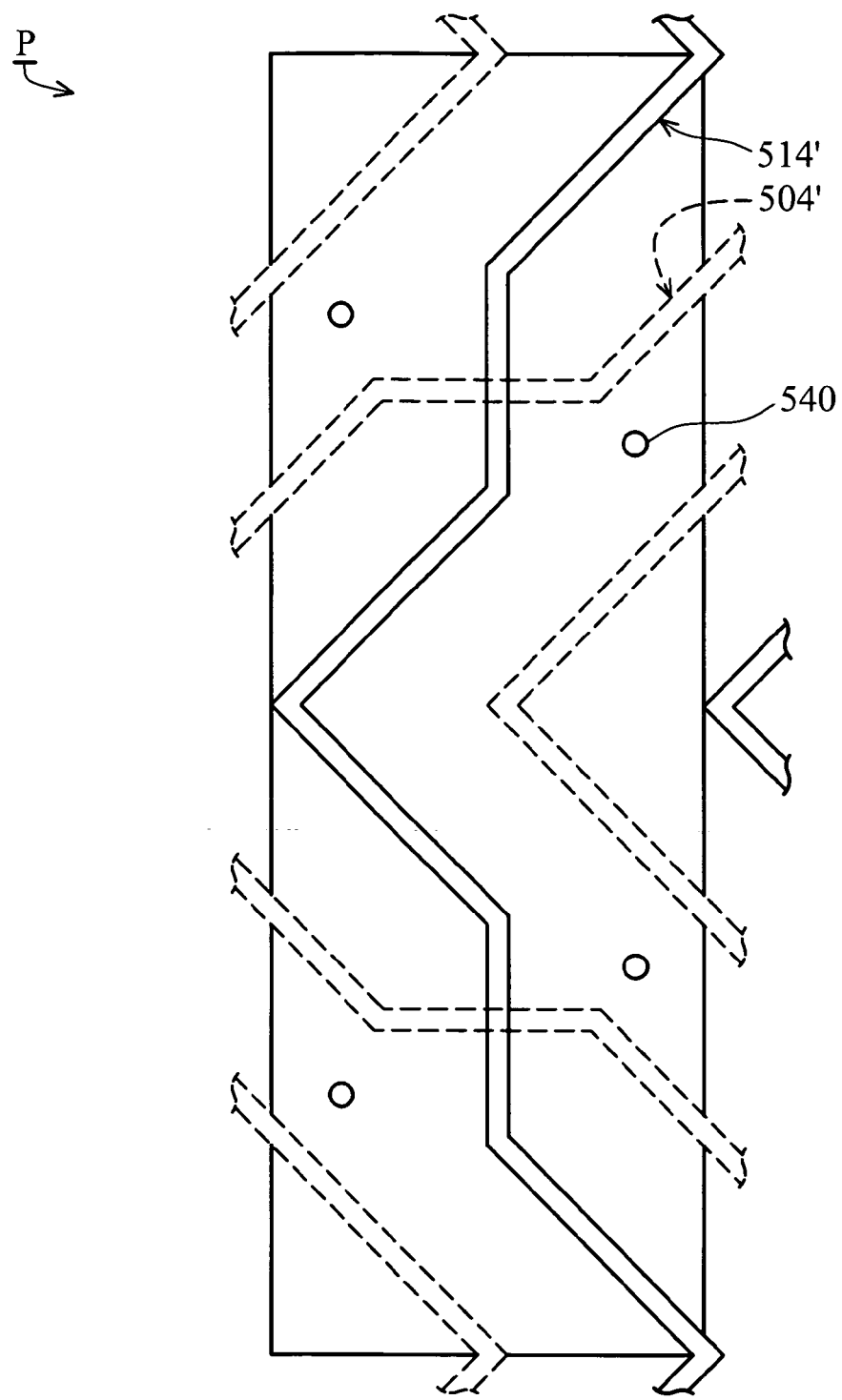
Figure 5E:
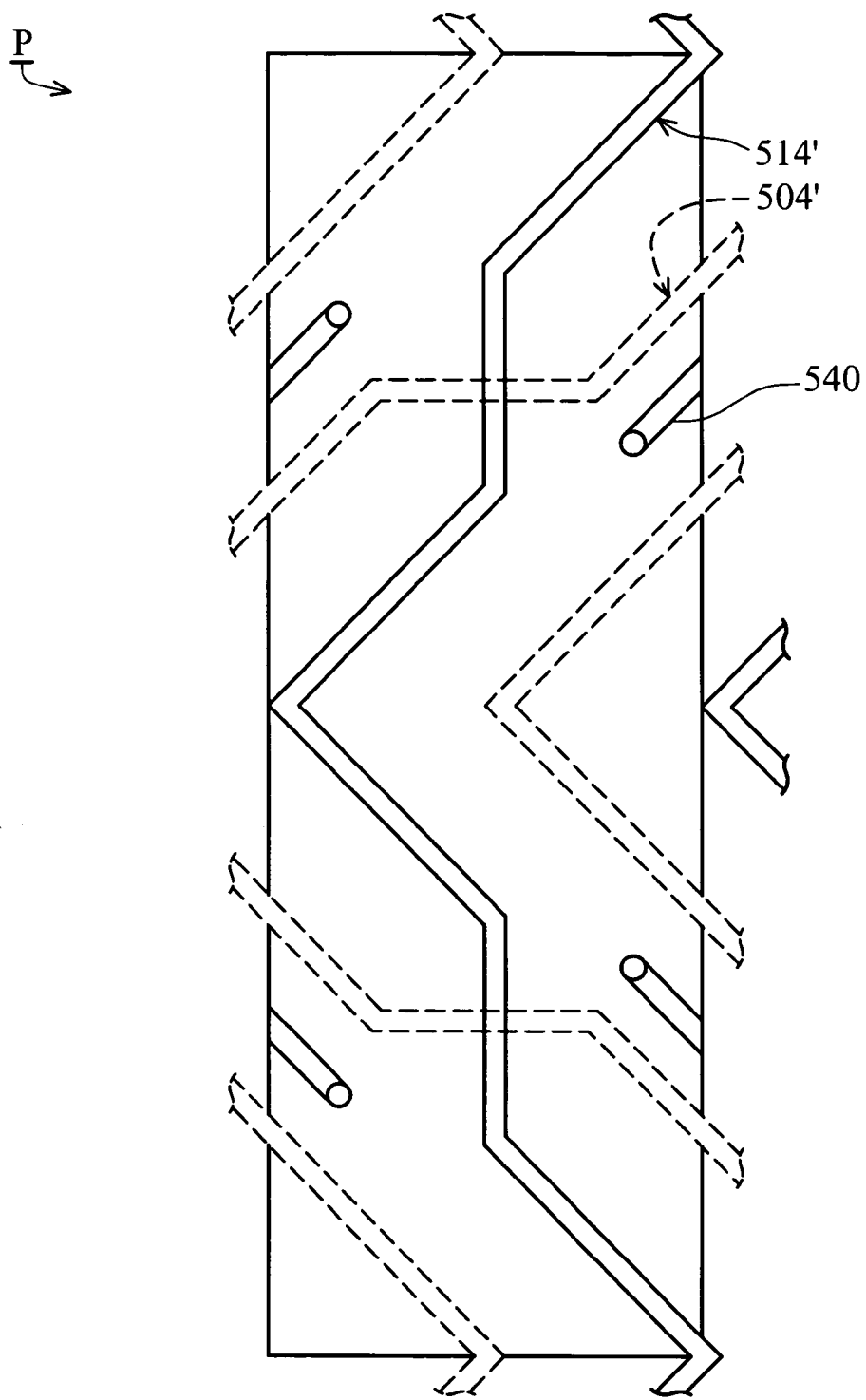

FIG. 5A is a partial cross-section view of a wide-viewing angle LCD according to a third embodiment of the invention, taken along line 5A—A of FIG. 5B. FIG. 5B is a schematic top view showing one of the pixels of a wide-viewing angle LCD according to the third embodiment of the invention. FIGS. 5C, 5D and 5E are schematic top views showing one of the pixels of a wide-viewing angle LCD according to variations of the third embodiment. As shown in FIGS. 5B~5E, crossing bus lines (i.e. gate and data lines) define a pixel unit P. Although a single pixel unit P is illustrated in FIGS. 5A~5E, a liquid crystal display typically has a plurality of pixel units P arranged in an array.

In FIGS. 5A and 5B, a first substrate 500 and a second substrate 510 opposite thereto are parallel to each other. The first substrate 500 can be a glass substrate comprising a thin film transistor (TFT, not shown). The second substrate 510 can be a glass substrate comprising a color filter (CF, not shown) A pixel electrode 502 is disposed on the interior of the first substrate 500. The pixel electrode 502 can be a transparent conductive layer, such as indium-tin-oxide (ITO) or indium-zinc-oxide (IZO), formed by deposition and patterning. The pixel electrode 502 is electrically connected to the TFT (not shown). A slit structure 504 with a first pattern 504' is then formed in the pixel electrode 502. A first alignment film 506 is next formed on the pixel electrode 502 to cover the slit structure 504. Referring to FIG. 5B, the first pattern 504' comprises sequential combinations of a first line segment 5041, a second line segment 5042 and a third line segment 5043. The first and third line segments 5041 and 5043 are parallel but not opposite to each other. The second line segment 5042 is not parallel and not perpendicular to the first and third line segments 5041 and 5043.

A common electrode 512 is disposed on the interior of the second substrate 510. The common electrode 512 can be a transparent conductive layer, such as ITO or IZO, formed by deposition. A first protrusion structure 514 with a second pattern 514' is then disposed on the common electrode 512. The first protrusion structure 514 can be an insulating layer of photoresist formed by deposition and patterning. A second alignment film 516 is next formed on the common electrode 512 to cover the second protrusion structure 514. Referring to FIG. 5B, the second pattern 514' comprises sequential combinations of a fourth line segment 5141, a fifth line segment 5142 and a sixth line segment 5143. The fourth and sixth line segments 5141 and 5143 are parallel but not opposite to each other. The fifth line segment 5142 is not parallel and not perpendicular to the fourth and sixth line segments 5141 and 5143.

Negative type liquid crystal molecules 518 (Δε<0) are then filled in a space between the first substrate 500 and the second substrate 510, constituting a liquid crystal layer 520.

Note that the first pattern 504' and the second pattern 514' constitute a third pattern 530 with at least one intersection. That is, the second line segment 5042 and the fifth line segment 5142 constitute a cross. According to the third embodiment, a liquid crystal molecule orientation area has a whirlwind arrangement surrounding the intersection (i.e. the cross). A liquid crystal display with omnidirectional viewing angle characteristics is thus obtained.

Due to the transverse electric fields between bus lines (i.e. gate and data lines), disclination areas 998 occur in the regions as shaded in FIG. 5B. In order to prevent occurrence of the disclination areas 998, variations of the third embodiment are provided. In FIGS. 5C, 5D and 5E, a second protrusion structure 540 is formed on part of the common electrode 512. The location of the second protrusion structure 540 corresponds to a region near an interior side of the pixel electrode 502 (or the pixel unit P). The second protrusion structure 540 results in orderly alignment of liquid crystal molecules to prevent occurrence of disclination areas 998. The second protrusion structure 540 can be a linear protrusion structure shown in FIG. 5C, a circular protrusion structure shown in FIG. 5D or combinations of linear and circular protrusion structures shown in FIG. 5E. Note that a slit structure can replace the second protrusion structure 540, and achieves the same effect of preventing occurrence of disclination areas 998.

Fourth Embodiment

Figure 6A:
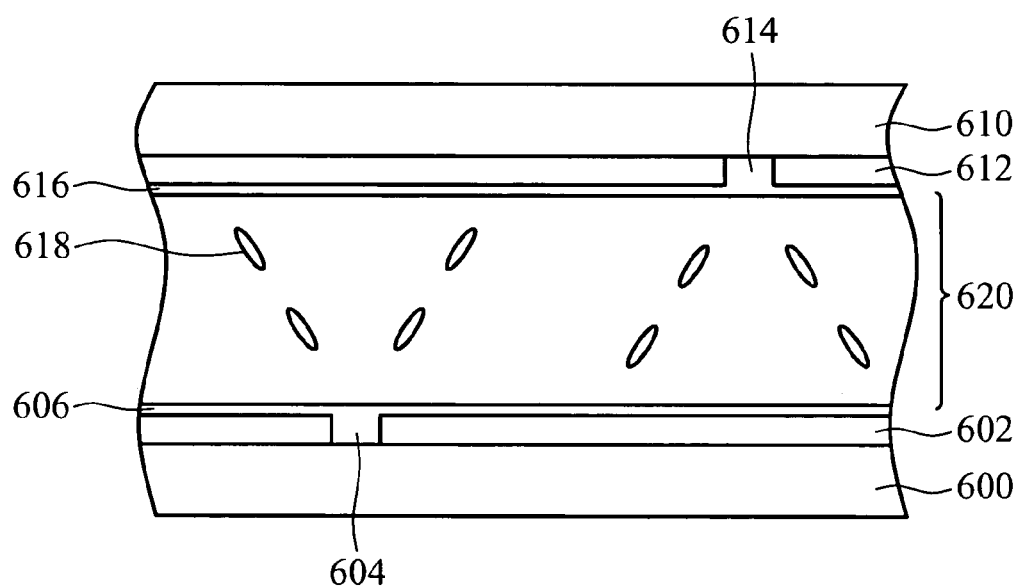
FIG. 6A is a partial cross-section view of a wide-viewing angle LCD according to a fourth embodiment of the invention, taken along line 6A—6A of FIG. 6B.
Figure 6B:
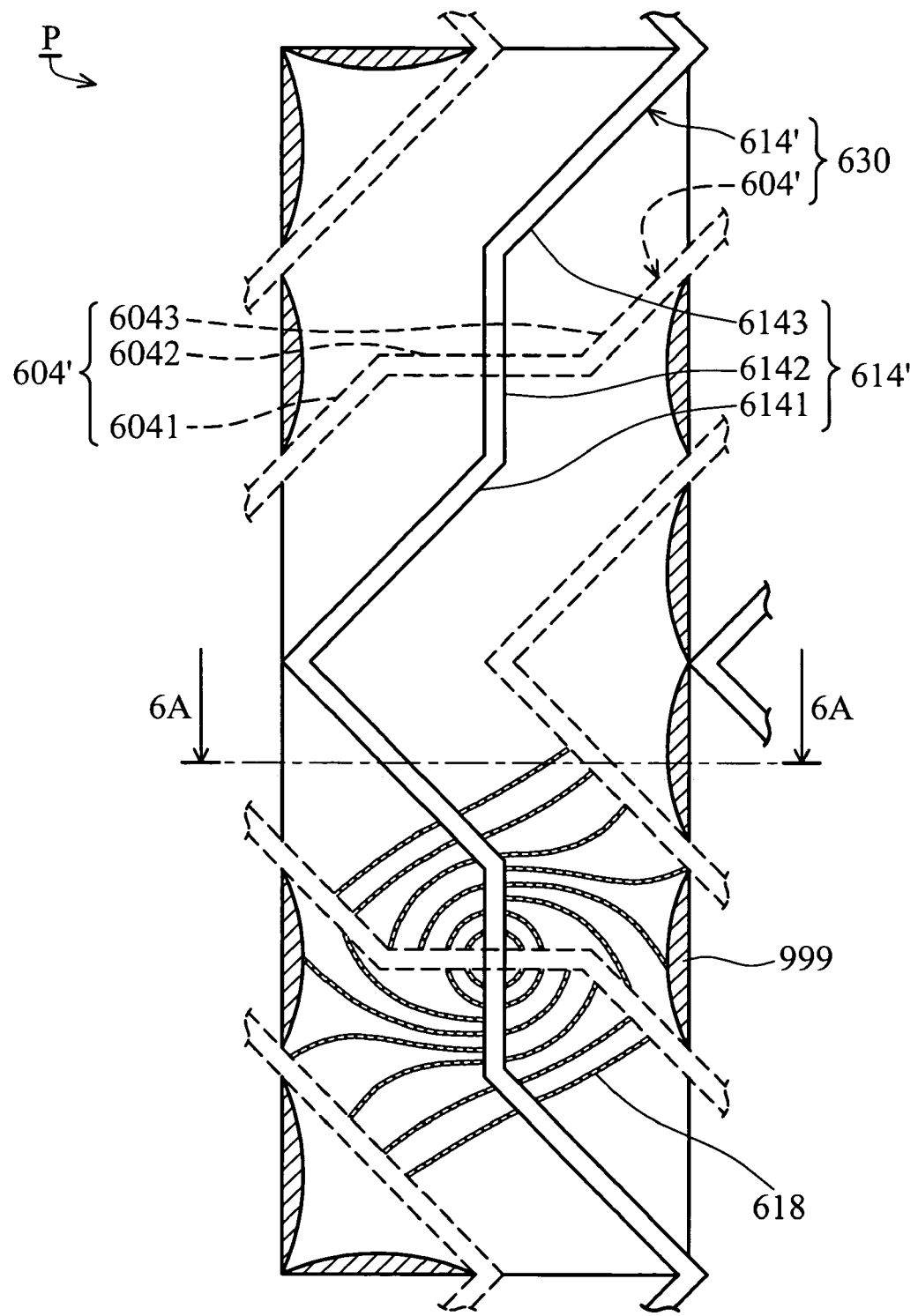
FIG. 6B is a schematic top view showing one of the pixels of a wide-viewing angle LCD according to the fourth embodiment of the invention.
Figure 6C:
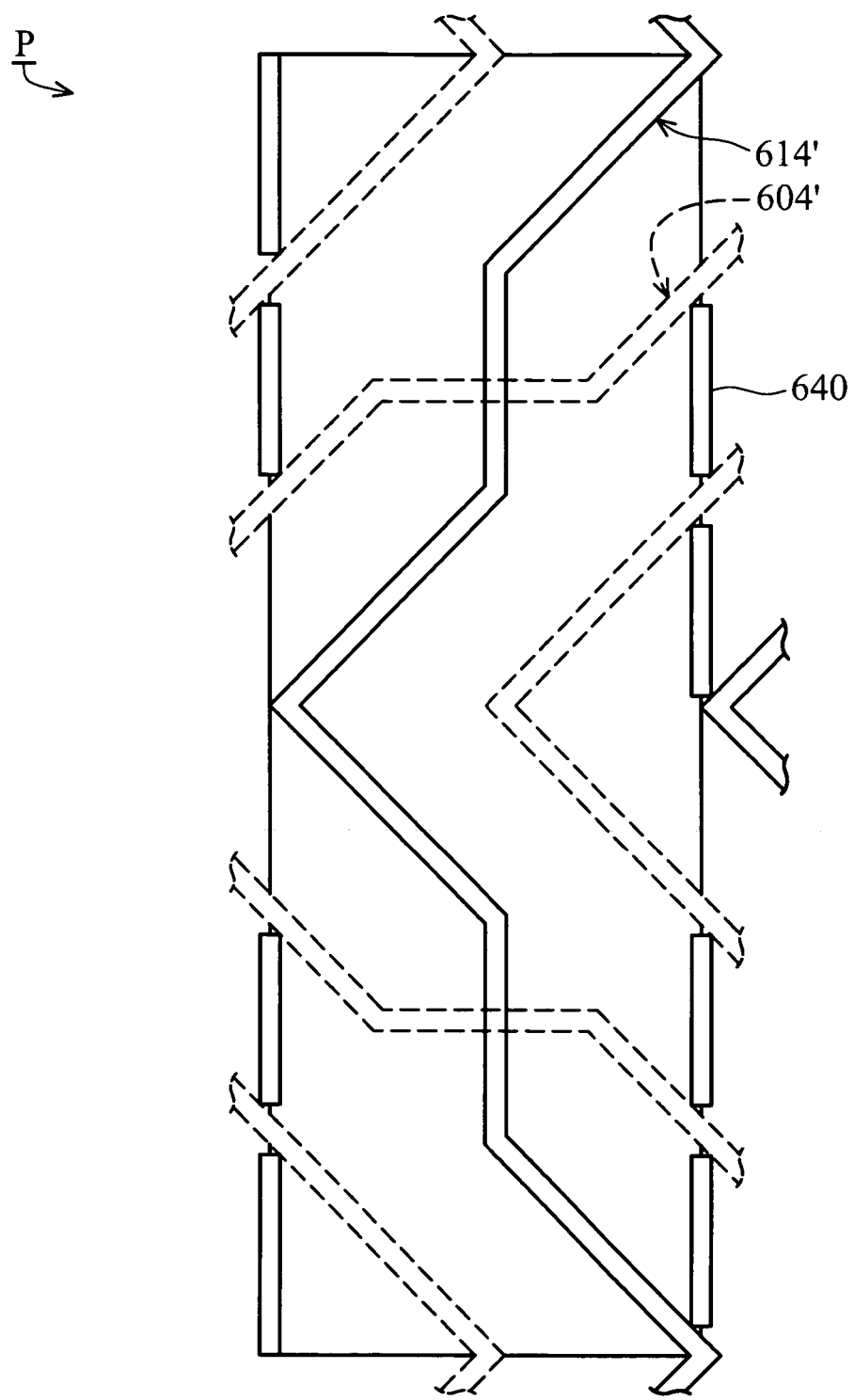
FIGS. 6C, 6D and 6E are schematic top views showing one of the pixels of a wide-viewing angle LCD according to variations of the fourth embodiment.
Figure 6D:
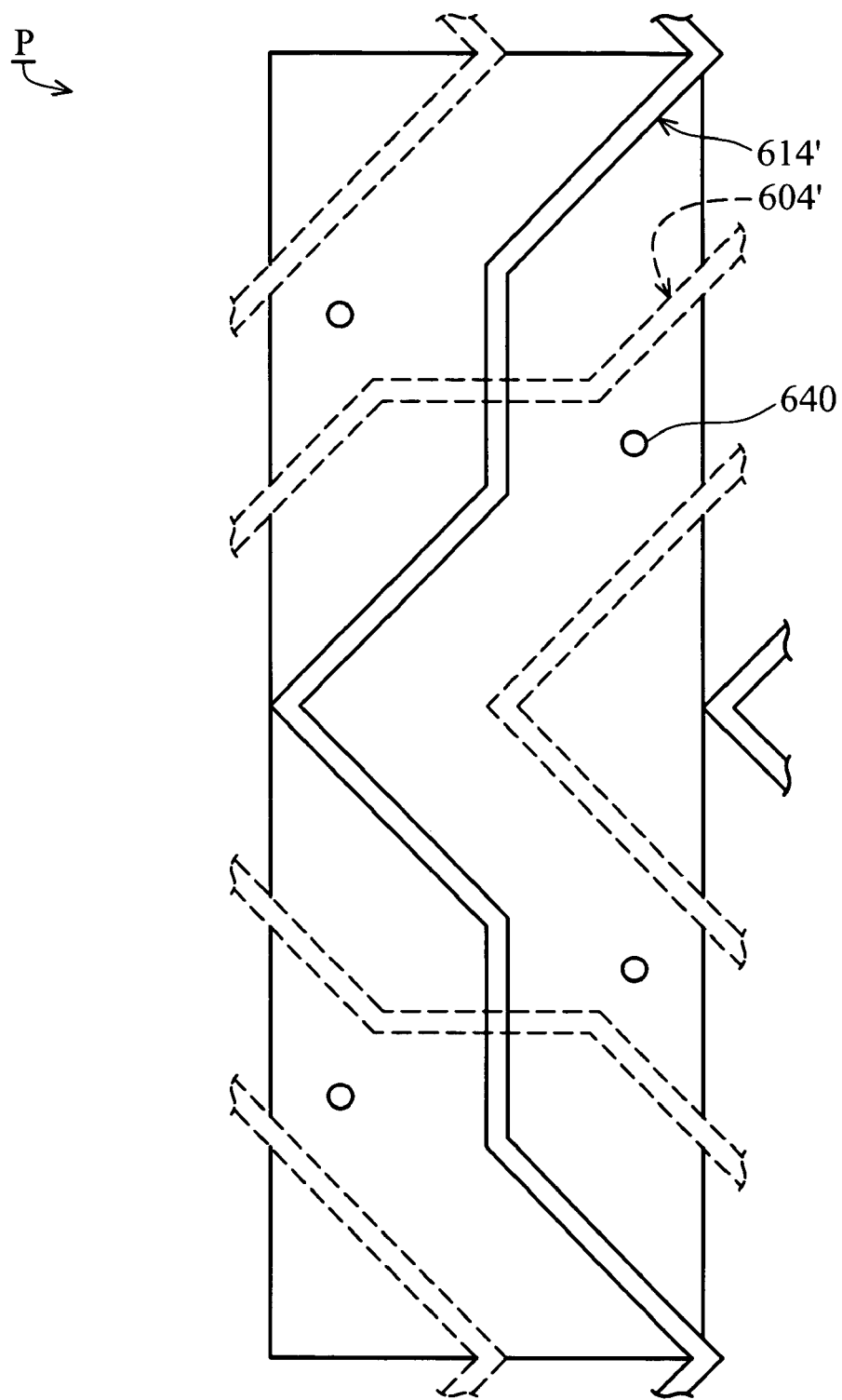
Figure 6E:
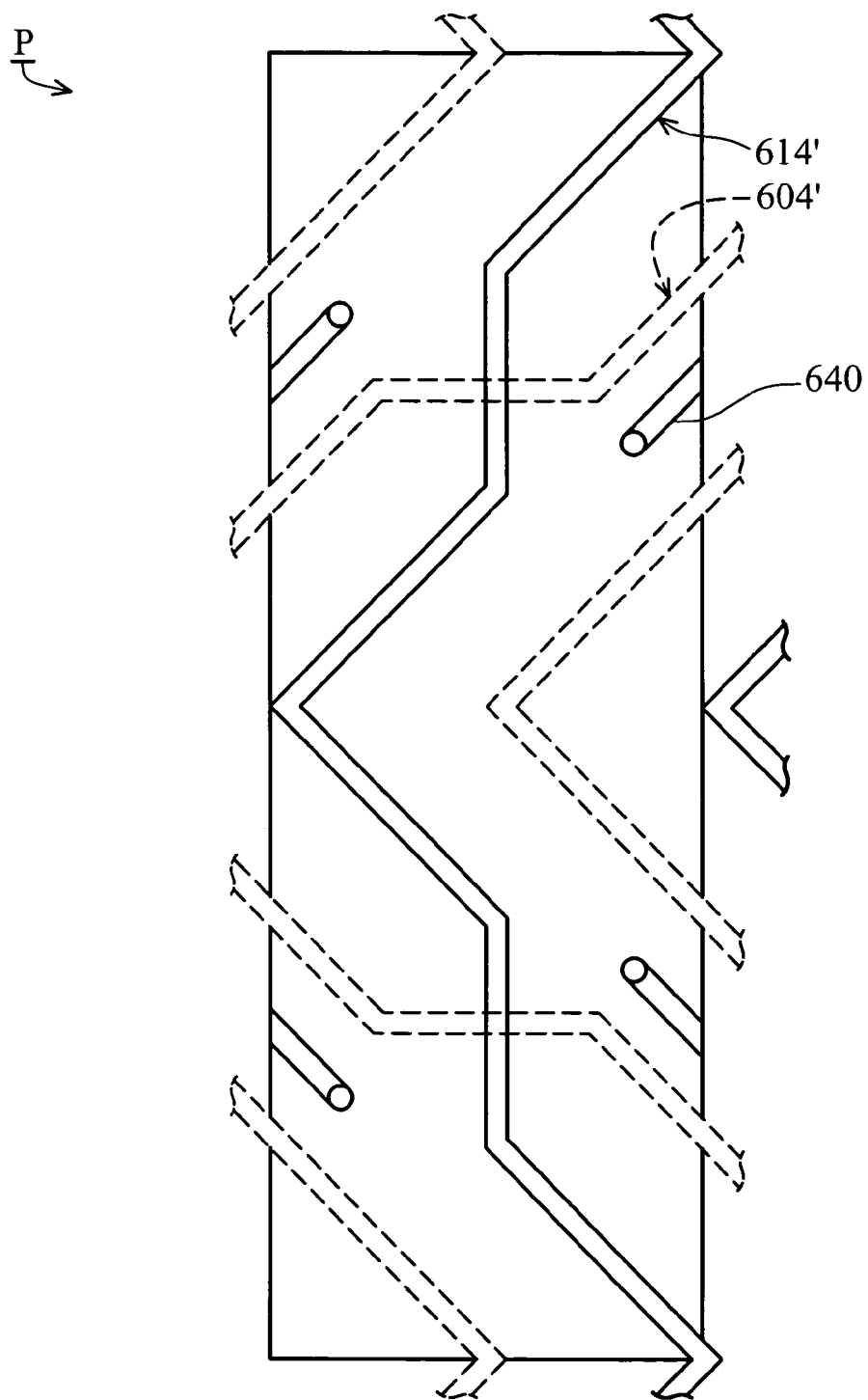

FIG. 6A is a partial cross-section view of a wide-viewing angle LCD according to a fourth embodiment of the invention, taken along line 6A—6A of FIG. 6B. FIG. 6B is a schematic top view showing one of the pixels of a wide-viewing angle LCD according to the fourth embodiment of the invention. FIGS. 6C, 6D and 6E are schematic top views showing one of the pixels of a wide-viewing angle LCD according to variations of the fourth embodiment. As shown in FIGS. 6B~6E, crossing bus lines (i.e. gate and data lines) define a pixel unit P. Although a single pixel unit P is illustrated in FIGS. 6A~6E, a liquid crystal display generally has a plurality of pixel units P arranged in an array.

In FIGS. 6A and 6B, a first substrate 600 and a second substrate 610 are parallel to each other. The first substrate 600 can be a glass substrate comprising a thin film transistor (TFT, not shown). The second substrate 610 can be a glass substrate comprising a color filter (CF, not shown). A pixel electrode 602 is disposed on the interior of the first substrate 600. The pixel electrode 602 can be a transparent conductive layer, such as indium-tin-oxide (ITO) or indium-zinc-oxide (IZO), formed by deposition and patterning. The pixel electrode 602 is electrically connected to the TFT (not shown). A first slit structure 604 with a first pattern 604' is then formed in the pixel electrode 602. A first alignment film 606 is next formed on the pixel electrode 602 to cover the first slit structure 604. Referring to FIG. 6B, the first pattern 604' comprises sequential combinations of a first line segment 6041, a second line segment 6042 and a third line segment 6043. The first and third line segments 6041 and 6043 are parallel but not opposite to each other. The second line segment 6042 is not parallel and not perpendicular to the first and third line segments 6041 and 6043.

A common electrode 612 is disposed on the interior of the second substrate 610. The common electrode 612 can be a transparent conductive layer, such as ITO or IZO, formed by deposition. A second slit structure 614 with a second pattern 614' is then formed in the common electrode 612. A second alignment film 616 is next formed on the common electrode 612 to cover the second slit structure 614. Referring to FIG. 6B, the second pattern 614' comprises sequential combinations of a fourth line segment 6141, a fifth line segment 6142 and a sixth line segment 6143. The fourth and sixth line segments 6141 and 6143 are parallel but not opposite to each other. The fifth line segment 6142 is not parallel and not perpendicular to the fourth and sixth line segments 6141 and 6143.

Negative type liquid crystal molecules 618 (Δε<0) are then filled in a space between the first substrate 600 and the second substrate 610, constituting a liquid crystal layer 620.

Note that the first pattern 604' and the second pattern 614' constitute a third pattern 630 with at least one intersection. That is, the second line segment 6042 and the fifth line segment 6142 constitute a cross. According to the fourth embodiment, a liquid crystal molecule orientation area has a whirlwind arrangement surrounding the intersection (i.e. the cross). A liquid crystal display with omnidirectional viewing angle characteristics is thus obtained.

Due to the transverse electric fields between bus lines (i.e. gate and data lines), disclination areas 999 occur in the regions as shaded in FIG. 6B. In order to prevent the occurrence of the disclination areas 999, variations of the fourth embodiment are provided. In FIGS. 6C, 6D and 6E, a third slit structure 640 is formed on part of the common electrode 612. The location of the third slit structure 640 corresponds to a region near an interior side of the pixel electrode 602 (or the pixel unit P). The third slit structure 640 results in orderly alignment of liquid crystal molecules to prevent occurrence of disclination areas 999. The third slit structure 640 can be a linear slit structure shown in FIG. 6C, a circular slit structure shown in FIG. 6D or combinations of linear and circular slit structures shown in FIG. 6E. Note that a protrusion structure can replace the third slit structure 640, and achieves the same effect of preventing occurrence of disclination areas 999.

Figure 7:
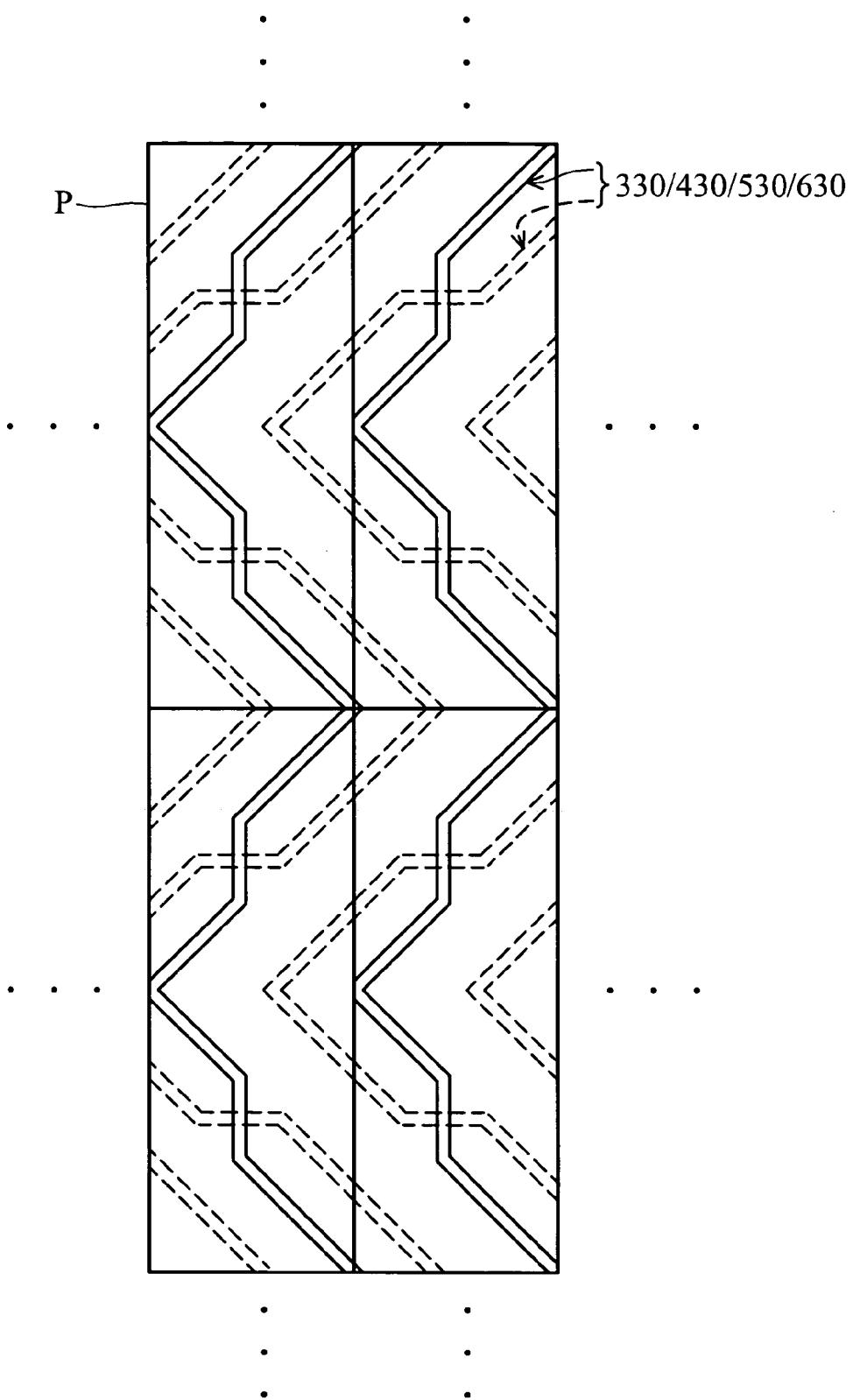
FIG. 7 is a schematic top view showing a protrusion or slit layout of an embodiment of the invention.

FIG. 7 is a schematic top view showing a protrusion or slit layout of an embodiment of the invention. In FIG. 7, the third pattern 330/430/530/630 is arranged in a zigzag pattern in all the pixel units P.

Thus, the embodiments of the invention provide a wide-viewing angle LCD. A first protrusion or slit structure with a first pattern is formed on a pixel electrode. A second protrusion or slit structure with a second pattern is formed on a common electrode. The first and second patterns constitute a third pattern with at least one intersection. Thus, the LCD comprises a liquid crystal molecule orientation area having a whirlwind arrangement surrounding the intersection (i.e. the crisscross), thereby providing omnidirectional viewing angle characteristics to improve display quality and ameliorating the disadvantages of the conventional technology.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wide-viewing angle liquid crystal (LCD) comprising a plurality of pixel units, each comprising:
    a first substrate: and a second substrate disposed opposite each other with a liquid crystal
      layer interposed therebetween;

first electrode formed on an interior of the first substrate:
a first protrusion structure with a first pattern formed on the first electrode;
a second electrode formed on an interior of the second substrate; and
a second protrusion structure with a second pattern formed on the second electrode;
wherein the first and second patterns constitute a third pattern with at least one intersection;
wherein the first pattern comprises sequential combinations of a first line segment, a second line segment and a third line segment, the first and third line segments are parallel but not opposite to each other, and the second line segment is not parallel and not perpendicular to the first and third line segments;
wherein the second pattern comprises sequential combinations of a fourth line segment, a fifth line segment and a sixth line segment, the fourth and sixth line segments are parallel but not opposite to each other, and the fifth line segment is not parallel and not perpendicular to the fourth and sixth line segments.

2. The wide-viewing angle LCD. according to claim 1, wherein the second line segment and the fifth line segment comprises a cross.

3. The wide-viewing angle LCD according to claim 1, wherein the third pattern is arranged in a zigzag pattern in the pixel units.

4. The wide-viewing angle LCD according to claim 1, wherein the liquid crystal layer comprises negative type liquid crystal molecules.

5. The wide-viewing angle LCD according to claim 4, further comprising a liquid crystal molecule orientationl area having a whirlwind arrangement surrounding the intersection.

6. The wide-viewing angle LCD according to claim 1, wherein:
when the first electrode serves as a pixel electrode, the second electrode serves as a common electrode; and
when the first electrode serves as a common electrode, the second electrode serves as a pixel electrode.

7. The wide-viewing angle LCD according to claim 1, further comprising a third protrusion structure or a slit structure formed on part of the second electrode, wherein the third protrusion structure or the slit structure corresponds to a region near an interior side of the pixel unit to prevent diselination areas.

8. A wide-viewing angle LCD comprising a plurality of pixel units, each comprising:
a first substrate and a second substrate disposed opposite each other with a liquid crystal layer interposed therebetween;
a first electrode formed on an interior of the first substrate;
a protrusion structure with a first pattern, formed on the first electrode;
a second electrode formed on an interior of the second substrate; and
a slit structure with a second pattern formed on the second electrode;
wherein the first and second patterns constitute a third pattern with at least one intersection;
wherein the first pattern comprises sequential combinations of a first line segment, a second line segment and a third line segment, the first and third line segments are parallel but not opposite to each other and the second line segment is not parallel and not perpendicular to the first and third line segments;
wherein the second pattern comprises sequential combinations of a fourth line segment, a fifth line segment and a sixth line segment,the fourth and sixth line segments are parallel but not opposite to each other, and the fifth line segment is not parallel and not perpendicular to the fourth and sixth line segments.

9. The wide-viewing angle LCD according to claim 8, wherein the second line segment and the fifth line segment comprise a cross.

10. The wide-viewing angle LCD according to claim 8, wherein the third pattern is arranged in a zigzag pattern in the pixel units.

11. The wide-viewing angle LCD according to claim 8, wherein the liquid crystal layer comprises negative type liquid crystal molecules.

12. The wide-viewing angle LCD according to claim 11, further comprising a liquid crystal molecule orientation area having a whirlwind arrangement surrounding the intersection.

13. The wide-viewing angle LCD according to claim 8, wherein:
when the first electrode serves as a pixel electrode, the second electrode serves as a common electrode; and
when the first electrode serves as a common electrode, the second electrode serves as a pixel electrode.

14. The wide-viewing angle LCD according to claim 8, further comprising a second protrusion structure or a second slit structure formed on part of the second electrode, wherein the second protrusion structure or the second slit structure corresponds to a region near an interior side of the pixel unit to prevent disclination areas.

15. A wide-viewing angle LCD comprising a plurality of pixel units, each comprising:
a first substrate and a second substrate disposed opposite each other with a liquid crystal layer interposed therebetween;
a first electrode formed on an interior of the first substrate;
a first slit structure with a first pattern formed on the first electrode;
a second electrode formed on an interior of the second substrate;
a second slit structure with a second pattern formed on the second electrode;
wherein the first and second patterns constitute a third pattern with at least one intersection;
wherein the first pattern comprises sequential combinations of a first line segment, a second line segment and a third line segment, the first and third line segments are parallel but not opposite to each other, and the second line segment is not parallel and not perpendicular to the first and third line segments:
wherein the second pattern comprises sequential combinations of a fourth line segment, a fifth line segment and a sixth line segment, the fourth and sixth line segments are parallel but not opposite to each other, and the fifth line segment is not parallel and not perpendicular to the fourth and sixth line segments.

16. The wide-viewing angle LCD according to claim 15, wherein the second line segment and the fifth line segment comprise a cross.

17. The wide-viewing angle LCD according to claim 15, wherein the third pattern is arranged in a zigzag pattern in the pixel units.

18. The wide-viewing angle LCD according to claim 15, wherein the liquid crystal layer comprises negative type liquid crystal molecules.

19. The wide-viewing angle LCD according to claim 18, further comprising a liquid crystal molecule orientation area having a whirlwind arrangement surrounding the intersection.

20. The wide-viewing angle LCD according to claim 15, wherein:
when the first electrode serves as a pixel electrode, the second electrode serves as a common electrode; and
when the first electrode serves as a common electrode, the second electrode serves as a pixel electrode.

21. The wide-viewing angle LCD according to claim 19, further comprising a
second protrusion structure or a second slit structure formed on part of the second electrode, wherein the second protrusion structure or the second slit structure corresponds to a region near an interior side of the pixel unit to prevent disclination areas.

* * * * *